(12) United States Patent
Murakami et al.

(10) Patent No.: US 9,808,402 B2
(45) Date of Patent: Nov. 7, 2017

(54) LIQUID MEDICINE PREPARATION SYSTEM AND METHOD OF PREPARING LIQUID MEDICINE

(71) Applicant: KABUSHIKI KAISHA YASKAWA DENKI, Kitakyushu-shi (JP)

(72) Inventors: Hiroaki Murakami, Kitakyushu (JP); Makoto Umeno, Kitakyushu (JP); Shigeji Tasaka, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 77 days.

(21) Appl. No.: 14/967,369

(22) Filed: Dec. 14, 2015

(65) Prior Publication Data

US 2016/0228329 A1 Aug. 11, 2016

(30) Foreign Application Priority Data

Feb. 6, 2015 (JP) ................................. 2015-022637

(51) Int. Cl.
*A61J 1/20* (2006.01)
*B25J 9/00* (2006.01)
*B25J 21/00* (2006.01)
*A61J 1/16* (2006.01)

(52) U.S. Cl.
CPC . *A61J 1/20* (2013.01); *A61J 1/16* (2013.01); *A61J 1/2096* (2013.01); *B25J 9/0087* (2013.01); *B25J 21/00* (2013.01)

(58) Field of Classification Search
CPC .... A61J 1/16; A61J 1/20; A61J 1/2096; B25J 9/0087; B25J 21/00

USPC ............................. 141/2, 319, 329; 700/245
See application file for complete search history.

(56) References Cited

U.S. PATENT DOCUMENTS

| 7,343,943 | B2 * | 3/2008 | Khan .................. | B65B 3/003 141/2 |
| 7,783,383 | B2 * | 8/2010 | Eliuk .................. | A61J 1/20 141/1 |
| 8,820,365 | B2 * | 9/2014 | Aguerre .............. | B65B 3/003 141/192 |
| 9,033,006 | B2 * | 5/2015 | Perazzo .............. | A61J 7/0053 141/319 |
| 9,073,206 | B2 * | 7/2015 | Carson ............... | B25J 9/0096 |
| 9,446,525 | B2 * | 9/2016 | Umeno ............... | B25J 15/0033 |

(Continued)

FOREIGN PATENT DOCUMENTS

| EP | 2457549 | 5/2012 |
| EP | 2742926 | 6/2014 |

(Continued)

OTHER PUBLICATIONS

Office Action (Search Report and Written Opinion) for the corresponding Singapore Patent Application No. 10201508873S dated Feb. 25, 2016.

(Continued)

*Primary Examiner* — Timothy L Maust
(74) *Attorney, Agent, or Firm* — Mori & Ward, LLP

(57) ABSTRACT

A liquid medicine preparation system that prepares a liquid medicine includes: a preparing zone in which preparation work of the liquid medicine is performed by a robot; and a storing zone which has a plurality of first spaces each of which is capable of storing a container housing the liquid medicine prepared.

13 Claims, 11 Drawing Sheets

(56) References Cited

U.S. PATENT DOCUMENTS

| | | | |
|---|---|---|---|
| 9,474,691 B2* | 10/2016 | Yuyama | A61J 1/20 |
| 9,561,156 B2* | 2/2017 | Koike | A61J 3/002 |
| 2011/0067781 A1* | 3/2011 | Osborne | B65B 3/003 |
| | | | 141/37 |
| 2012/0318402 A1 | 12/2012 | Aguerre et al. | |
| 2013/0345859 A1* | 12/2013 | Omura | A61J 7/0069 |
| | | | 700/231 |
| 2014/0373975 A1* | 12/2014 | Koike | A61J 3/002 |
| | | | 141/114 |
| 2015/0250678 A1 | 9/2015 | Eliuk et al. | |
| 2015/0251780 A1* | 9/2015 | Matsukuma | A61J 1/2096 |
| | | | 141/2 |
| 2015/0335531 A1 | 11/2015 | Yuyama et al. | |

FOREIGN PATENT DOCUMENTS

| | | |
|---|---|---|
| JP | 2013-052250 | 3/2013 |
| WO | WO 2014/065196 | 5/2014 |

OTHER PUBLICATIONS

Extended European Search Report for corresponding EP Application No. 15196402.0-1651, dated Jul. 8, 2016.

* cited by examiner

FIG. 7
FIG. 7A
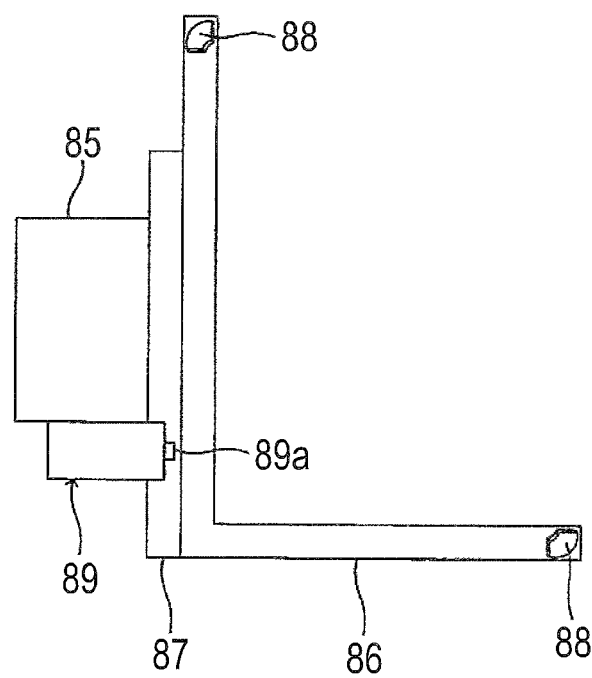
FIG. 7B
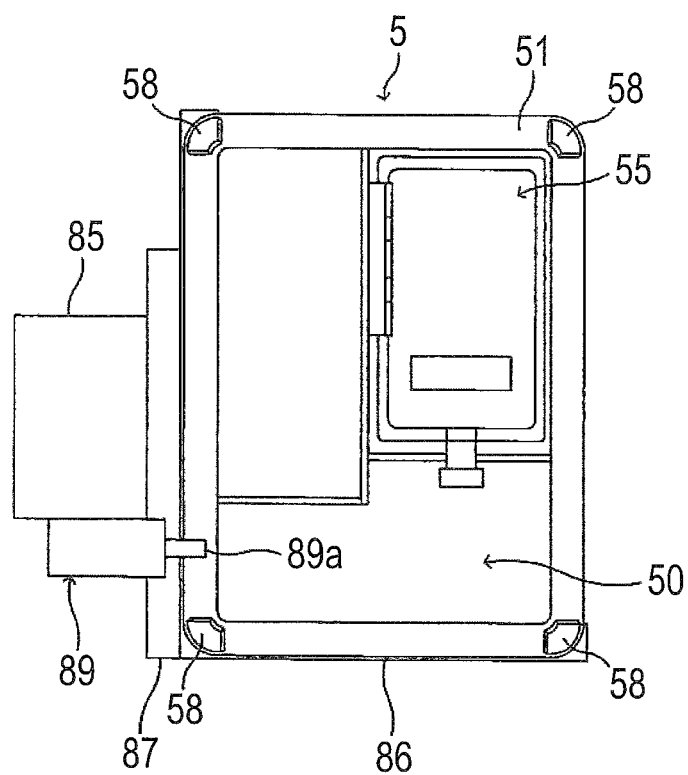

LIQUID MEDICINE PREPARATION SYSTEM AND METHOD OF PREPARING LIQUID MEDICINE

The present disclosure contains subject matter related to that disclosed in Japanese Priority Patent Application JP 2015-022637 filed in the Japan Patent Office on Feb. 6, 2015, the entire contents of which are hereby incorporated by reference.

BACKGROUND

Field of the Invention

The embodiment disclosed herein relates to a liquid medicine preparation system and a method of preparing a liquid medicine.

Description of the Related Art

JP 2013-52250 A describes a coinfusion device that performs preparation by mixing a medicinal agent such as an anti-cancer agent into an infusion solution, and transfers the prepared liquid medicine to an infusion bag. This coinfusion device is provided with a housing section in which a housing container that receives the infusion bag used in coinfusion is arranged.

In the coinfusion device of the related art described above, the housing container is taken out from the housing section when the coinfusion processing ends. This taking-out work is considered to be manually performed by a user, for example. Thus, it is necessary for the user to perform the taking-out work whenever the coinfusion processing is performed in a case in which the coinfusion processing is continuously performed, for example, which may become a factor that hinders automation.

The present disclosure has been made in view of such a problem, and an object thereof is to provide a liquid medicine preparation system and a method of preparing a liquid medicine that are capable of promoting automation.

SUMMARY

To achieve the object, according to a viewpoint of the present disclosure, a liquid medicine preparation system is applied, the system that prepares a liquid medicine including: a preparing zone in which preparation work of the liquid medicine is performed by a robot; and a storing zone which has a plurality of first spaces each of which is capable of storing a container housing the liquid medicine prepared.

In addition, according to another viewpoint of the present disclosure, a liquid medicine preparation system is applied, the system that prepares a liquid medicine including: a first zone in which preparation work of the liquid medicine is performed by a robot; a second zone in which tools to be used in the preparation work are set for each single set, the single set having a predetermined one of the tools; and a third zone which is arranged between the first zone and the second zone.

In addition, according to another viewpoint of the present disclosure, a method of preparing a liquid medicine is applied, the method including: performing preparation work of the liquid medicine using a robot; and storing containers that house the prepared liquid medicine respectively in a plurality of spaces.

In addition, according to another viewpoint of the present disclosure, a liquid medicine preparation system is applied, the system that prepares a liquid medicine including: a unit of performing preparation work of the liquid medicine using a robot, and a unit of stocking at least any one of a tool to be used in the preparation work and a container that houses the prepared liquid medicine in the state of being partitioned in unit of the preparation work.

According to the liquid medicine preparation system and the like of the present disclosure, it is possible to promote the automation.

BRIEF DESCRIPTION OF THE DRAWINGS

FIG. 7A is an explanatory diagram illustrating an example of a configuration of a holder of the taking-in-and-out device;

FIG. 7B is an explanatory diagram illustrating an example of a state in which the tray is held by the holder;

DESCRIPTION OF THE EMBODIMENTS

Hereinafter, an embodiment will be described with reference to the drawings.

<1. Medicinal Liquid Preparation System>

First, a description will be given regarding an example of an overall schematic configuration of a liquid medicine preparation system according to the embodiment with reference to FIG. 1. Incidentally, hereinafter, directions of "up", "down", "left", "right", "front", "rear", and the like are defined as directions noted in each drawing of FIGS. 1 to 5 and the like, and will be used as appropriate for the convenience in describing a structure of the liquid medicine preparation system or the like. However, each direction changes depending on an installation mode of the liquid medicine preparation system or the like, and is not limited to a positional relationship of each configuration.

Figure 1:
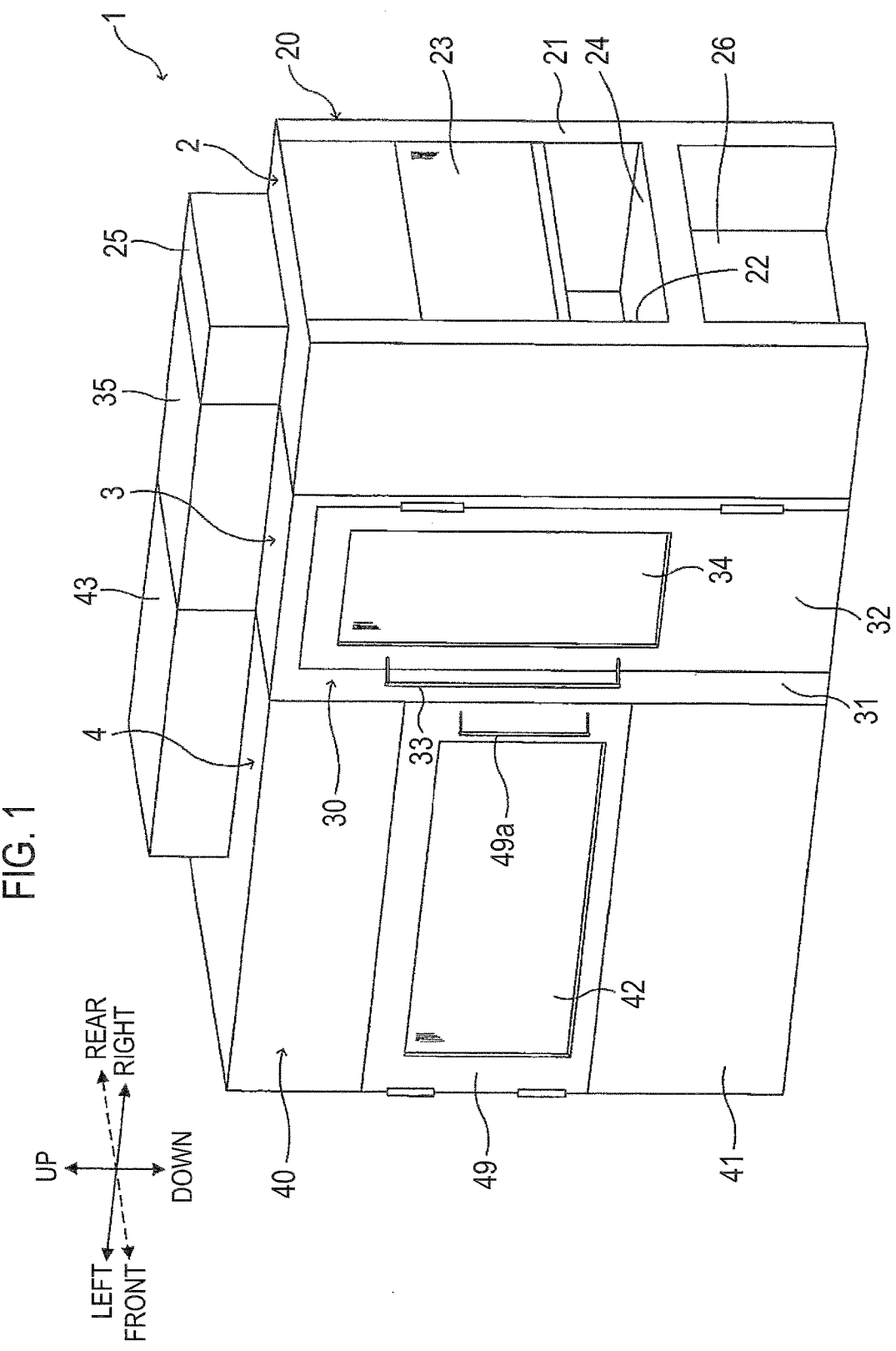
FIG. 1 is an explanatory diagram illustrating an example of an overall schematic configuration of a liquid medicine preparation system according to an embodiment.

As illustrated in FIG. 1, a liquid medicine preparation system 1 has a preparatory chamber 2, a storage chamber 3, and a preparation chamber 4. The storage chamber 3 is arranged between the preparatory chamber 2 and the preparation chamber 4.

The preparatory chamber 2 is a cabinet for performing setting work of a tool necessary for a user to prepare a liquid medicine therein. The preparatory chamber 2 has a casing 20 formed in, for example, a substantially rectangular parallelepiped shape. An opening section 22 and a concave section 26 are formed in a wall section 21 on the right side of the casing 20. A shutter 23 is provided in the opening section 22 so as to open and close the opening section 22. The shutter 23 is made of a material (for example, glass or the like) having light permeability at a degree that allows the user to view the inside of the casing 20 from the outside of the casing 20 through the shutter 23. The shutter 23 is configured to be lifted and lowered so as to close the opening section 22 by being lowered, and to open the opening section 22 by being lifted.

Figure 2:
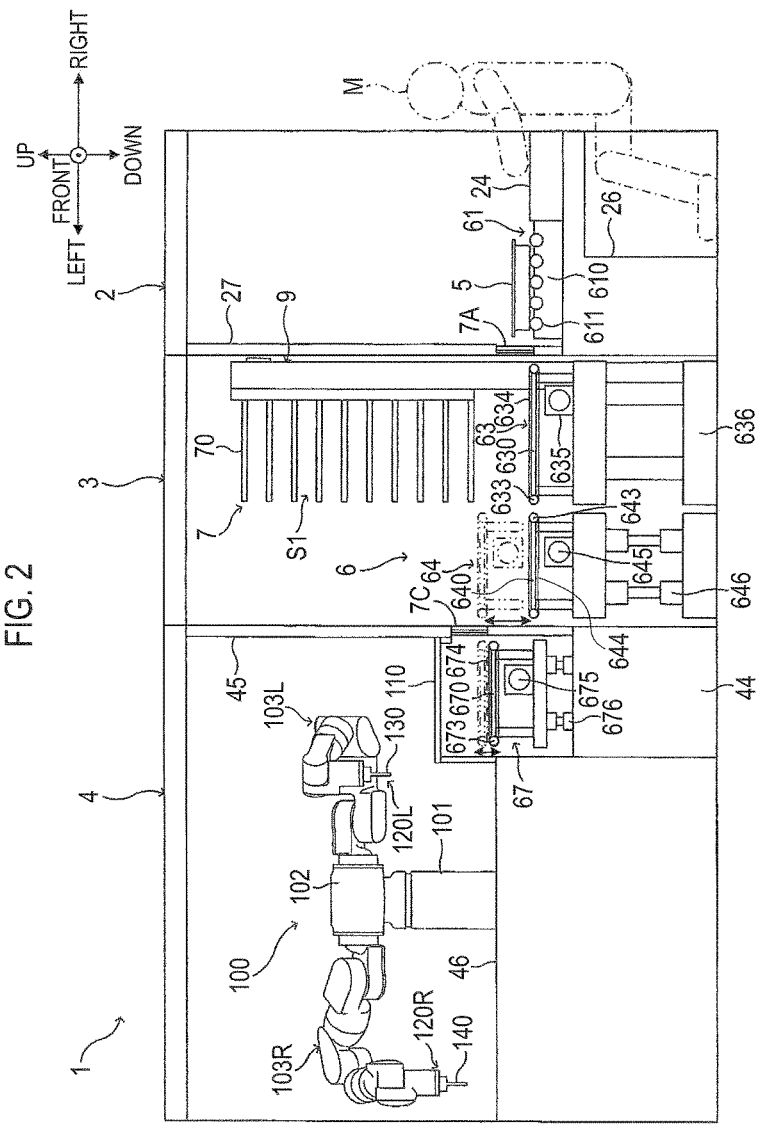
FIG. 2 is an explanatory diagram illustrating an example of a configuration of a transport device of a tray.

For example, a user M slightly opens the opening section 22 by lifting the shutter 23 to put the arm inside the casing 20 from the opening section 22, and performs the setting work on a workbench 24 as illustrated in FIG. 2 to be described later. The setting work is performed by housing sets one by one in a tray 5 (see FIG. 6A and the like to be described later), the set being predetermined tools among a plurality of tools to be used in preparation work. In addition, the concave section 26 allows the user M to put the legs therein when working in the state of being seated.

Incidentally, the positions of the opening section 22 and the concave section 26 are not limited to the right side of the casing 20, but may be formed on the front side of the casing 20, for example.

The storage chamber 3 is a cabinet for accommodating the tray 5. To be specific, the storage chamber 3 stores a plurality of the trays 5 in which the tools for preparation are housed for each single set in the preparatory chamber 2. In other words, the tools for preparation set in the preparatory chamber 2 are once stocked in the storage chamber 3 before being used for the preparation work in the preparation chamber 4. In addition, the storage chamber 3 has a plurality of first spaces S1 (see FIG. 4 to be described later) each of which is capable of storing a bag 55 (see FIG. 6B to be described later, referred to as a "container 55" as appropriate hereinafter) serving as a container housing a prepared liquid medicine which has been prepared in the preparation chamber 4. Incidentally, the container that houses the liquid medicine is not limited to the bag 55, but may be, for example, bottles 56a and 56b, or a syringe 53 (see FIG. 6A to be described later). Although details will be described later, the plurality of first spaces S1 are configured as storage racks 7 (see FIGS. 2 and 4 to be described later) on which the plurality of trays 5 are placed. In other words, the tool before being used in the preparation work is stocked, and further, the prepared liquid medicine is once stocked before being taken out to the outside of the liquid medicine preparation system 1, in the storage chamber 3.

The storage chamber 3 has a casing 30 formed in, for example, a substantially rectangular parallelepiped shape. A door 32, which can be opened and closed, is provided in a wall section 31 on a front side of the casing 30. A handle 33 and a window 34 are provided in the door 32. Although details will be described later, the user can move the above-described storage rack 7 outside the storage chamber 3 by opening the door 32, and collectively take out the prepared liquid medicine from the storage rack 7. In addition, it is possible to view a storage state through the window 34.

The preparation chamber 4 is a cabinet that allows a robot 100 (see FIGS. 2 and 3 to be described later) to perform the preparation work of the liquid medicine and the like therein. The tray 5 is loaded from the storage chamber 3 to the preparation chamber 4. The robot 100 performs the preparation work using the tools housed in one or the plurality of trays 5 thus loaded, and houses the container 55 (including the bag 55, the bottles 56a and 56b, the syringe 53, and the like) in which the prepared liquid medicine is housed in the tray 5. The tray 5 in which the container 55 is housed is unloaded from the preparation chamber 4 to the storage chamber 3, and is stored in the storage rack 7 again. In this manner, the prepared liquid medicine is once stocked in the storage chamber 3 before being taken out to the outside of the liquid medicine preparation system 1.

The preparation chamber 4 has a casing 40 formed in, for example, a substantially rectangular parallelepiped shape. A door 49 provided with a handle 49a is positioned in a wall section 41 on the front side of the casing 40 so as to be opened and closed, and a window 42 is provided in the door 49. The user can perform maintenance work such as greasing-up of the robot 100 and exchange of an actuator by opening the door 49. In addition, it is possible to view a work state or the like of the robot 100 through the window 42 during preparation work.

Fan units 25, 35 and 43 are provided in ceiling portions of the casing 20 of the preparatory chamber 2, the casing 30 of the storage chamber 3, and the casing 40 of the preparation chamber 4, respectively. These fan units 25, 35 and 43 form, for example, downdraft inside the casings 20, 30 and 40, and hold negative pressure inside the casings 20, 30 and 40 with respect to the outside. At this time, the pressure inside the storage chamber 3 may be held to be positive pressure with respect to the preparatory chamber 2 and the preparation chamber 4. In this case, it is possible to prevent a hazardous substance inside the preparatory chamber 2 and the preparation chamber 4 from flowing in the storage chamber 3 at the time of opening shutters 7A to 7D to be described later. Further, air inside the casings 20, 30 and 40 is taken in, and the taken-in air is purified by, for example, a high efficiency particulate air (HEPA) filter or the like, and then, is discharged to outdoors or the like through an exhaust duct (not illustrated).

Incidentally, the preparatory chamber 2, the storage chamber 3, and the preparation chamber 4 may be a chamber that can perform the setting work, the preparation work and the like described above inside thereof, and whether to have a function of adjusting air current or air pressure, whether to have a function of holding an internal space in an aseptic state, or whether to have a function of preventing leakage of the hazardous substance using the fan unit described above is not particularly limited. In addition, it is possible to use, for example, a draft chamber, a clean bench, an isolator, and the like as the preparatory chamber 2, the storage chamber 3, and the preparation chamber 4 other than, a so-called safety cabinet.

Incidentally, the preparatory chamber 2 is an example of a preparatory zone and a second zone, the storage chamber 3 is an example of a storing zone and a third zone, and the preparation chamber 4 is an example of a preparation zone and a first zone. Although the embodiment is described by exemplifying a case in which each zone is partitioned as a chamber which is substantially closed space, the disclosure is not limited thereto. Each zone may be opened to the outside, and may be a region partitioned in response to a use of each zone.

In addition, the preparation chamber 4 corresponds to an example of a means for performing the preparation work of the liquid medicine using the robot 100, and the storage chamber 3 corresponds to an example of a unit of stocking at least one of the containers housing the tool and the prepared liquid medicine to be used in the preparation work in the state of being partitioned in unit of the preparation work.

<2. Transport Device>

Next, a description will be given regarding an example of a transport device of the tray 5 in the liquid medicine preparation system 1 with reference to FIGS. 2 and 3. Incidentally, a taking-in-and-out device and the like of the storage chamber 3 are not illustrated in FIGS. 2 and 3, as appropriate, in order to prevent complexity.

Figure 3:
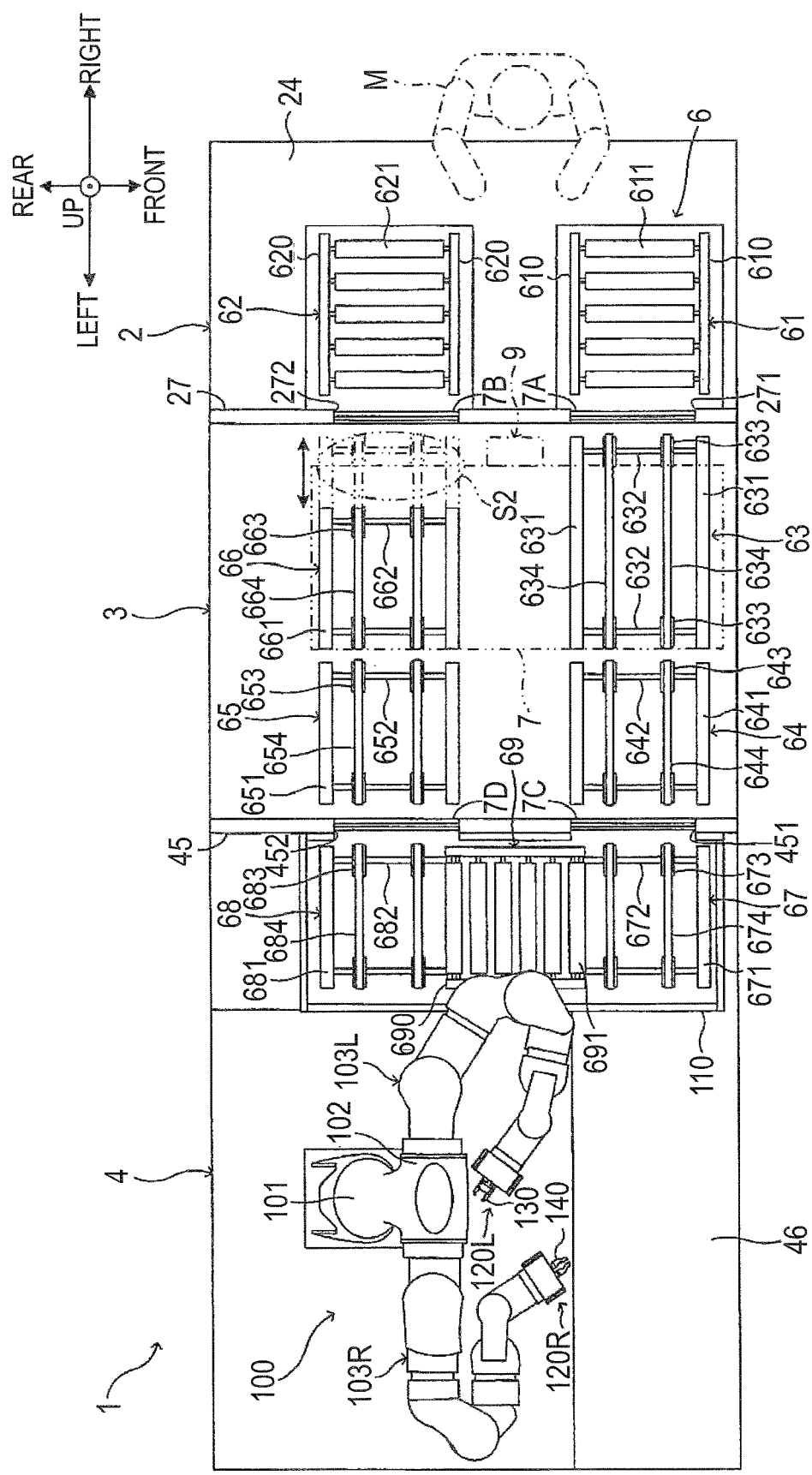
FIG. 3 is an explanatory diagram illustrating an example of the configuration of the transport device of the tray.

As illustrated in FIGS. 2 and 3, the transport device 6 has two motor roller devices 61 and 62 arranged inside the preparatory chamber 2, four conveyor devices 63, 64, 65 and 66 arranged inside the storage chamber 3, two conveyor devices 67 and 68, and a motor roller device 69 arranged inside the preparation chamber 4. The transport device 6 transports the tray 5 in the order of the motor roller device 61, the conveyor devices 63, 64 and 67, the motor roller device 69, the conveyor devices 68, 65 and 66, and the motor roller device 62. In other words, a path of loading the tray 5 from the preparatory chamber 2 to the preparation chamber 4 via the storage chamber 3, and a path of unloading the tray 5 from the preparation chamber 4 to the preparatory chamber 2 via the storage chamber 3 are provided as different paths.

The motor roller device 61 transports the tray 5, which has been placed by the user M, to the left side to be passed to the conveyor device 63. The motor roller device 61 has a pair of frames 610 which are arranged to oppose each other, and a plurality of motor rollers 611. The plurality of motor rollers 611 are rotatably provided between the pair of frames 610, and are arranged in parallel along a transport direction (right-and-left direction). The motor roller device 62 transports the tray 5 passed from the conveyor device 66 toward the right side to the workbench 24. The motor roller device 62 has a pair of frames 620 which are arranged to oppose each other, and a plurality of motor rollers 621. The plurality of motor rollers 621 are rotatably provided between the pair of frames 620 and arranged in parallel along the transport direction (right-and-left direction). The motor roller devices 61 and 62 are arranged in parallel in a front-and-rear direction in the preparatory chamber 2. In addition, the motor roller devices 61 and 62 are arranged such that each upper end of the motor rollers 611 and 621 is at the substantially same height as an upper surface of the workbench 24. Accordingly, it is possible to perform a smooth sliding movement of the tray 5 between the workbench 24 and the motor roller devices 61 and 62.

The conveyor device 63 is arranged on the left side of the motor roller device 61 below the storage rack 7. The conveyor device 63 transports the tray 5, which has been passed from the motor roller device 61, toward the left side to be passed to the conveyor device 64. The conveyor device 63 has a pair of frames 630 which are arranged to oppose each other (not illustrated in FIG. 3), a guide member 631 (not illustrated in FIG. 2), a pair of rotation shafts 632, a plurality of wheel members 633, a plurality of conveyor belts 634, a motor 635 (not illustrated in FIG. 3), and a base member 636.

The guide member 631 is provided above each of the frames 630, and serves a function of guiding the transport direction of the tray 5 while a flange 51 (see FIGS. 6A and 6B to be described later) of the tray 5 being placed thereon. Incidentally, although the guide member 631 on the rear side between a pair of the guide members 631 is provided in the conveyor device 63 in the embodiment, the guide member 631 on the front side is provided in the storage rack 7 (see FIGS. 4, 5A and 5B to be described later). Incidentally, both the pair of guide members 631 may be provided in the conveyor device 63.

The rotation shafts 632 are rotatably provided at the upstream side (right end side in FIGS. 2 and 3) and the downstream side (left end side in FIGS. 2 and 3) in the transport direction between the pair of frames 630. A pair of the wheel members 633 is provided to each of the rotation shafts 632. The conveyor belt 634 is wound around the corresponding wheel members 633 and 633, the plurality of conveyor belts 634 are arranged in parallel in the front-and-rear direction, in this example. The motor 635 rotates any one of or both the pair of rotation shafts 632 to rotate the wheel member 633, thereby driving the conveyor belt 634. The base member 636 is fixedly provided to a floor surface of the casing 30 of the storage chamber 3.

The conveyor device 64 is arranged on the left side of the conveyor device 63. The conveyor device 64 transports the tray 5, which has been passed from the conveyor device 63, toward the left side to be passed to the conveyor device 67. A basic configuration of the conveyor device 64 is the same as that of the conveyor device 63, and has a pair of frames 640 (not illustrated in FIG. 3), which are arranged to oppose each other, a pair of guide members 641 (not illustrated in FIG. 2), a pair of rotation shafts 642, a plurality of wheel members 643, a plurality of conveyor belts 644, a motor 645 (not illustrated in FIG. 3), and a lifting and lowering device 646.

The conveyor device 64 has a function of lifting and lowering the conveyor belt 644 and the like using the lifting and lowering device 646. A power source of the lifting and lowering device 646 can be, for example, a servo motor, but is not limited thereto, and may be another power source, for example, a hydraulic cylinder, an air cylinder, or the like. The conveyor device 64 is provided such that a height of a belt upper end is substantially the same as a height of a belt upper end of the conveyor device 63 at the upstream side in a lower end position (position indicated by the solid line in FIG. 2), and the height of the belt upper end is substantially the same as a height of a belt upper end of the conveyor device 67 of the preparation chamber 4 (in detail, the conveyor device 67 which is lifted to be at an upper end position) in the upper end position (position indicated by the two-dot chain line in FIG. 2). Incidentally, the height of the belt upper end of the conveyor device 64 at the upper end position is substantially the same as a height of a lower end of the storage rack 7, for example. The conveyor device 64 is at the lower end position when the tray 5 is passed from the conveyor device 63, and is at the upper end position when taking the tray 5 in to or out from the storage rack 7 using the taking-in-and-out device 8 to be described later, and when passing the tray 5 to the conveyor device 67.

Incidentally, although a case in which the conveyor device 64 is lifted and lowered at two positions, that is, the upper end position and the lower end position has been described as above, the disclosure is not limited thereto, and the conveyor device 64 may be lifted and lowered at three or more positions. For example, the conveyor device 64 may be lifted and lowered at three positions including an intermediate position at which the tray 5 is passed to the conveyor device 67, and the upper end position at which the tray 5 is taken in to or out from the storage rack 7 using the taking-in-and-out device 8. It is possible to set the position in an arbitrary manner. In the embodiment, the description is given by exemplifying the case of lifting and lowering at the two positions for the convenience in description.

Incidentally, the lifting and lowering operation of the conveyor device 64 may be performed in the state of stopping the driving of the conveyor belt 644, or may be performed while driving the conveyor belt 644.

Although a relationship of lengths in the transport direction (right-and-left direction) of the conveyor devices 63 and 64 is not particularly limited, the conveyor device 64 having the lifting and lowering function has a longer length in the transport direction than the conveyor device 63 in the embodiment. In the examples illustrated in FIGS. 2 and 3, for example, the conveyor device 63 has the length in the transport direction at the same degree as those of the storage rack 7 and a rack moving device 9, and the conveyor device 64 has the length in the transport direction at the same degree as that of the tray 5, for example. Accordingly, it is possible to avoid interference with the storage rack 7 at the time of lifting the conveyor device 64, and it is possible to suppress increase in size of the storage chamber 3 while securing an installation space of the storage rack 7.

The conveyor device 65 (illustrated only in FIG. 3) is arranged on the rear side of the conveyor device 64. The conveyor device 65 transports the tray 5, which has been passed from the conveyor device 68 of the preparation chamber 4, toward the right side to be passed to the conveyor device 66. A configuration of the conveyor device 65 is the same as that of the conveyor device 64, and has a pair of frames 650 (not illustrated), which are arranged to oppose each other, a pair of guide members 651, a pair of rotation shafts 652, a plurality of wheel members 653, a plurality of conveyor belts 654, a motor 655 (not illustrated), and a lifting and lowering device (not illustrated).

An upper end position and a lower end position of the conveyor device 65 have the substantially same height as those of the conveyor device 64. The conveyor device 65 is at the upper end when the tray 5 is passed from the conveyor device 68 of the preparation chamber 4, and when the tray 5 is taken in to or out from the storage rack 7 using the taking-in-and-out device 8 to be described later, and is at the lower end position when the tray 5 is passed to the conveyor device 66. Incidentally, the lifting and lowering operation of the conveyor device 65 may be performed in the state of stopping the driving of the conveyor belt 654, or may be performed while driving the conveyor belt 654. In addition, a length in the transport direction (right-and-left direction) of the conveyor device 65 is substantially the same as that of the conveyor device 64, for example.

Incidentally, similar to the conveyor device 64, the conveyor device 65 also may be lifted and lowered at three or more positions. For example, the conveyor device 65 may be lifted and lowered at three positions including an intermediate position at which the tray 5 is passed from the conveyor device 68, and the upper end position at which the tray 5 is taken in to or out from the storage rack 7 using the taking-in-and-out device 8. It is possible to set the position in an arbitrary manner. In the embodiment, the description is given by exemplifying the case of lifting and lowering at the two positions for the convenience in description.

The conveyor device 66 (illustrated only in FIG. 3) is arranged on the right side of the conveyor device 65, and further the rear side of the conveyor device 63 below the storage rack 7. The conveyor device 66 transports the tray 5, which has been passed from the conveyor device 65, toward the right side to be passed to the motor roller device 62. A basic configuration of the conveyor device 66 is the same as that of the conveyor device 63 or the like, and has a pair of frames 660 (not illustrated), which are arranged to oppose each other, a pair of guide members 661, a pair of rotation shafts 662, a plurality of wheel members 663, a plurality of conveyor belts 664, a motor 665 (not illustrated), and a translation device 666 (not illustrated).

The conveyor device 66 has a translation function that reciprocatively moves the conveyor belt 664 and the like in the transport direction (right-and-left direction) using the translation device 666. A power source of the translation device 666 can be, for example, a servo motor, but is not limited thereto, and may be another power source, for example, a hydraulic cylinder, an air cylinder, or the like. The conveyor device 66 is adjacent to the conveyor device 65 at the upstream side when being moved to a left end position (position indicated by the solid line in FIG. 3), and is adjacent to the shutter 7B to be described later when being moved to the right end position (position indicated by the two-dot chain line in FIG. 3).

The conveyor device 66 has a shorter length in the transport direction (right-and-left direction) than the conveyor device 63. As a result, a second space S2 is formed so as to avoid interference with an arm member 90 of the rack moving device 9 is formed in a transport path when being moved to the left end position although the details will be described later. Incidentally, the translational operation of the conveyor device 66 may be performed in the state of stopping the driving of the conveyor belt 664 (that is, stopping the tray 5), or may be performed while driving the conveyor belt 664 (that is, moving the tray 5). Incidentally, the conveyor device 66 corresponds to an example of the transport device.

The conveyor devices 67 and 68 and the motor roller device 69 of the preparation chamber 4 are placed on a table 44 such that the conveyor belt and the motor roller thereof are arranged to be at higher positions than the motor roller devices 61 and 62 of the preparatory chamber 2 and the conveyor devices 63 to 66 of the storage chamber 3. Accordingly, it is possible to transport the tray 5 in a movable range of the robot 100. In addition, each upper side of the conveyor devices 67 and 68 and the motor roller device 69 is covered by a cover 110. Incidentally, a top plate of the cover 110 is not illustrated in FIG. 3. Accordingly, a space in which the conveyor devices 67 and 68 and the motor roller device 69 are stored, and a space in which the preparation work in the preparation chamber 4 is performed are partitioned. Incidentally, details of the cover 110 will be described later.

The conveyor device 67 is arranged on the left side of the conveyor device 64. The conveyor device 67 transports the tray 5 passed from the conveyor device 64 of the storage chamber 3 toward the left side to be received in the preparation chamber 4. A basic configuration of the conveyor device 67 is the same as that of the conveyor device 64, and has a pair of frames 670 (not illustrated in FIG. 3), which are arranged to oppose each other, a guide member 671 (not illustrated in FIG. 2), a pair of rotation shafts 672, a plurality of wheel members 673, a plurality of conveyor belts 674, a motor 675 (not illustrated in FIG. 3), and a lifting and lowering device 676. Incidentally, the guide member 671 is provided only in an end portion at the opposite side of the motor roller device 69.

The conveyor device 67 has a function of lifting and lowering the conveyor belt 674 and the like using the lifting and lowering device 676. Incidentally, the guide member 671 is not lifted or lowered, but is fixedly arranged at the substantially same height as the guide member 641 of the conveyor device 64 at the upper end position. The lifted and lowered amount of the conveyor device 67 is smaller than those of the conveyor devices 64 and 65, and is slight. The conveyor device 67 is at a lower position than an roller upper end of the motor roller device 69 to which the height of the belt upper end is adjacent, and in the lower end position (position indicated by the solid line in FIG. 2), and the height of the belt upper end is higher than the roller upper end of the motor roller device 69, and further, is at the substantially same height as the belt upper end of the conveyor device 64 at the upper end position of the storage chamber 3 in the upper end position (position indicated by the two-dot chain line in FIG. 2).

Accordingly, the conveyor device 67 is at the upper end position when the tray 5 is passed from the conveyor device 64, and thus, it is possible to smoothly receive the tray 5 by preventing a bottom portion of the tray 5 from being in contact with the motor roller 691 of the adjacent motor roller device 69. In addition, the conveyor device 67 is at the motor roller 691 when passing the tray 5 to the motor roller device 69, and thus, it is possible to smoothly receive and pass the tray 5 to the motor roller device 69 by setting the tray 5 to be in the state of being supported by the guide member 671 and floated from the conveyor belt 674 and preventing the bottom portion of the tray 5 from being in contact with the conveyor belt 674.

The conveyor device 68 (illustrated only in FIG. 3) is arranged on the rear side of the motor roller device 69. The conveyor device 68 transports the tray 5 passed from the motor roller device 69 toward the right side to the conveyor device 65 of the storage chamber 3. A configuration of the conveyor device 68 is the same as that of the conveyor device 67, and has a pair of frames 680 (not illustrated), which are arranged to oppose each other, a guide member 681, a pair of rotation shafts 682, a plurality of wheel members 683, a plurality of conveyor belts 684, a motor 685 (not illustrated), and a lifting and lowering device 686 (not illustrated). Incidentally, the guide member 681 is provided only in an end portion at the opposite side of the motor roller device 69, and is not lifted or lowered, but is fixedly arranged at the substantially same height as the guide member 651 of the conveyor device 65 at the upper end position.

The lifting and lowering operation of the conveyor device 68 is the same as that of the conveyor device 67. In other words, the conveyor device 68 is at the lower end position when the tray 5 is passed from the adjacent motor roller device 69, and thus, it is possible to smoothly receive the tray 5 by preventing the bottom portion of the tray 5 from being in contact with the conveyor belt 684. In addition, the conveyor device 68 is at the upper end position when passing the tray 5 to the conveyor device 65 of the storage chamber 3, and thus, it is possible to smoothly receive and pass the tray 5 to the conveyor device 65 by preventing the bottom portion of the tray 5 from being in contact with the motor roller 691 of the adjacent motor roller device 69.

The motor roller device 69 (illustrated only in FIG. 3) is arranged between the conveyor devices 67 and 68, and transports the tray 5, which has been received by the conveyor device 67, toward the rear side to be passed to the conveyor device 68. The motor roller device 69 is arranged such that the roller upper end thereof is lower than each belt upper end of the conveyor devices 67 and 68 at the upper end position, and is higher than each belt upper end of the conveyor devices 67 and 68 at the lower end position. A configuration of the motor roller device 69 is the same as those of the motor roller devices 61 and 62 of the preparatory chamber 2, and has a pair of frames 690, which are arranged to oppose each other, and a plurality of motor rollers 691. The plurality of motor rollers 691 are rotatably provided between the pair of frames 690, and are arranged in parallel along the transport direction (the front-and-rear direction).

The tray 5 is loaded from the storage chamber 3 to the preparation chamber 4 by the conveyor devices 64 and 67. Accordingly, the conveyor devices 64 and 67 correspond to examples of a loading device. In addition, the tray 5 is unloaded from the preparation chamber 4 to the storage chamber 3 by the conveyor devices 68 and 65. Accordingly, the conveyor devices 68 and 65 correspond to examples of an unloading device. The cover 110 is provided to cover a loading position of the tray 5 by the conveyor devices 64 and 67 (that is, the position of the conveyor device 67) and an unloading position of the tray 5 by the conveyor devices 68 and 65 (that is, the position of the conveyor device 68).

A plurality of shutters 7A, 7B, 7C and 7D are provided on the transport path of the transport device 6 configured as above. An opening 271, which is the transport path between the motor roller device 61 and the conveyor device 63, is formed on the front side of a wall section 27 on the left side of the casing 20 of the preparatory chamber 2, and the shutter 7A is configured so as to open and close the opening 271. In addition, an opening 272, which is the transport path between the conveyor device 66 and the motor roller device 62, is formed on the rear side of the wall section 27, and the shutter 7B is configured to open and close the opening 272. In addition, an opening 451, which is the transport path between the conveyor device 64 and the conveyor device 67, is formed on the front side of a wall section 45 on the right side of the casing 40 of the preparation chamber 4, and the shutter 7C is configured to open and close the opening 451. In addition, an opening 452, which is the transport path between the conveyor device 68 and the conveyor device 65, is formed on the rear side of the wall section 45, and the shutter 7D is configured to open and close the opening 452.

A power source for the shutters 7A to 7D can be, for example, a servo motor, but is not limited thereto, and may be another power source, for example, a hydraulic cylinder, an air cylinder, or the like. The shutters 7A to 7D are opened only in a case in which the tray 5 is passes therethrough, and are closed other than the case.

The drive of the motor roller device 61, the conveyor devices 63, 64 and 67, the motor roller device 69, the conveyor devices 68, 65 and 66, and the motor roller device 62 described above, which configure the transport device 6, is controlled by a controller 300 to be described later. In addition, the opening or closing operation of the shutters 7A to 7D is also controlled by the controller 300.

Incidentally, the configuration mode of the transport device 6 is not limited to the above description. For example, a conveyor device may be used as transport device in the preparatory chamber 2, and a motor roller device may be used as the transport device in the storage chamber 3. However, when the motor roller device having a smaller dimension in a height direction than the conveyor device is used as the transport device of the preparatory chamber 2 as in the embodiment, it is possible to secure the space (concave section 26) to store the legs of the user M while suppressing the increase in size of the preparatory chamber 2 as illustrated in FIG. 2.

In addition, a conveyor device without the lifting and lowering function may be used as the conveyor devices 64 and 65, and all the motor roller devices and the conveyor devices may be installed to be at the same height, for example. However, when the conveyor devices 64 and 65 have the lifting and lowering function as in the embodiment, it is possible to transport the tray 5 in the movable range of the robot 100 in the preparation chamber 4, and further, it is possible to lower each arrangement height of the conveyor devices 63 and 66 in the storage chamber 3. Thus, it is possible to expand a storage space using the storage rack 7, and further, it is possible to suppress increase in size of the liquid medicine preparation system 1.

In addition, the path of loading the tray 5 from the preparatory chamber 2 to the preparation chamber 4 via the storage chamber 3, and the path of unloading the tray 5 from the preparation chamber 4 to the preparatory chamber 2 via the storage chamber 3 may be provided as the same path, for example. However, when the loading path and the unloading path are provided as different paths as in the embodiment, it is possible to perform the loading of the tray 5 from the storage chamber 3 to the preparation chamber 4 and the unloading of the tray 5 from the preparation chamber 4 to the storage chamber 3 in parallel at the same time. Thus, it is possible to shorten a waiting time between the preparation work and the preparation work in the preparation chamber 4, and significantly shorten the total work time in the case of continuously performing the preparation work.

In addition, the configuration mode of the motor roller device or the conveyor device described above is merely an example, and the disclosure is not limited thereto. For example, the conveyor belt of the conveyor device may be provided as one belt having a wide width or the like, not as the pair of belts. In addition, a transport device other than the motor roller device and the conveyor device may be used.

<3. Robot>

Next, a description will be given regarding the robot 100 installed in the preparation chamber 4 with reference to FIGS. 2 and 3.

As illustrated in FIGS. 2 and 3, the robot 100 is a so-called dual-arm robot which has a base table 101, a torso section 102, and two arms 103L and 103R. The base table 101 is fixed to the floor surface of the casing 40 of the preparation chamber 4 using, for example, an anchor bolt or the like. Incidentally, the base table 101 may be fixed to a surface (for example, a ceiling surface, a side surface or the like) other than the floor surface of the casing 40. The torso section 102 is pivotally supported by an upper end portion of the base table 101.

The arm 103L is rotatably supported by a side portion on the right side of the torso section 102. The arm 103L is configured as an arm having seven joint portions and having seven degrees of freedom, for example. In addition, the arm 103R is rotatably supported by a side portion on the left side of the torso section 102. The arm 103R is configured as an arm having seven joint portions and having seven degrees of freedom, for example, as similar to the arm 103L.

A hand 120L attached to a front end of the arm 103L is provided with a pair of claw members 130 and 130 that can be operated in a direction of being spaced apart from and approach each other. In addition, a hand 120R attached to a front end of the arm 103R is provided with a pair of claw members 140 and 140 that can be operated in a direction of being spaced apart from and approach each other. The robot 100 can grip various types of the tools housed in the trays 5 using the claw members 130 and 140 of the hands 120L and 120R, or operate various types of devices and equipment (not illustrated) arranged on the workbench 46. Incidentally, the cover 110 is configured such that the rear side thereof is opened and closed, and the robot 100 is capable of accessing the tray 5 to be transported onto the conveyor device 68 although the details will be described later.

The operation of the robot 100 is controlled by the controller 300 to be described later. Incidentally, the robot 100 is not necessarily the dual-arm robot, and may be configured as a robot having a single arm. In addition, the number of joints and the degree of freedom of the arm are not limited to seven as above, and a robot having seven or more joints and degrees of freedom may be configured.

<4. Storage Rack and Taking-in-and-Out Device>

Next, a description will be given regarding examples of the storage rack and the taking-in-and-out device with reference to FIG. 4. Incidentally, in FIG. 4, contents of the casing 30, the rack moving device 9, the tray 5 and the like of the storage chamber 3 are not illustrated in order to prevent complexity.

Figure 4:
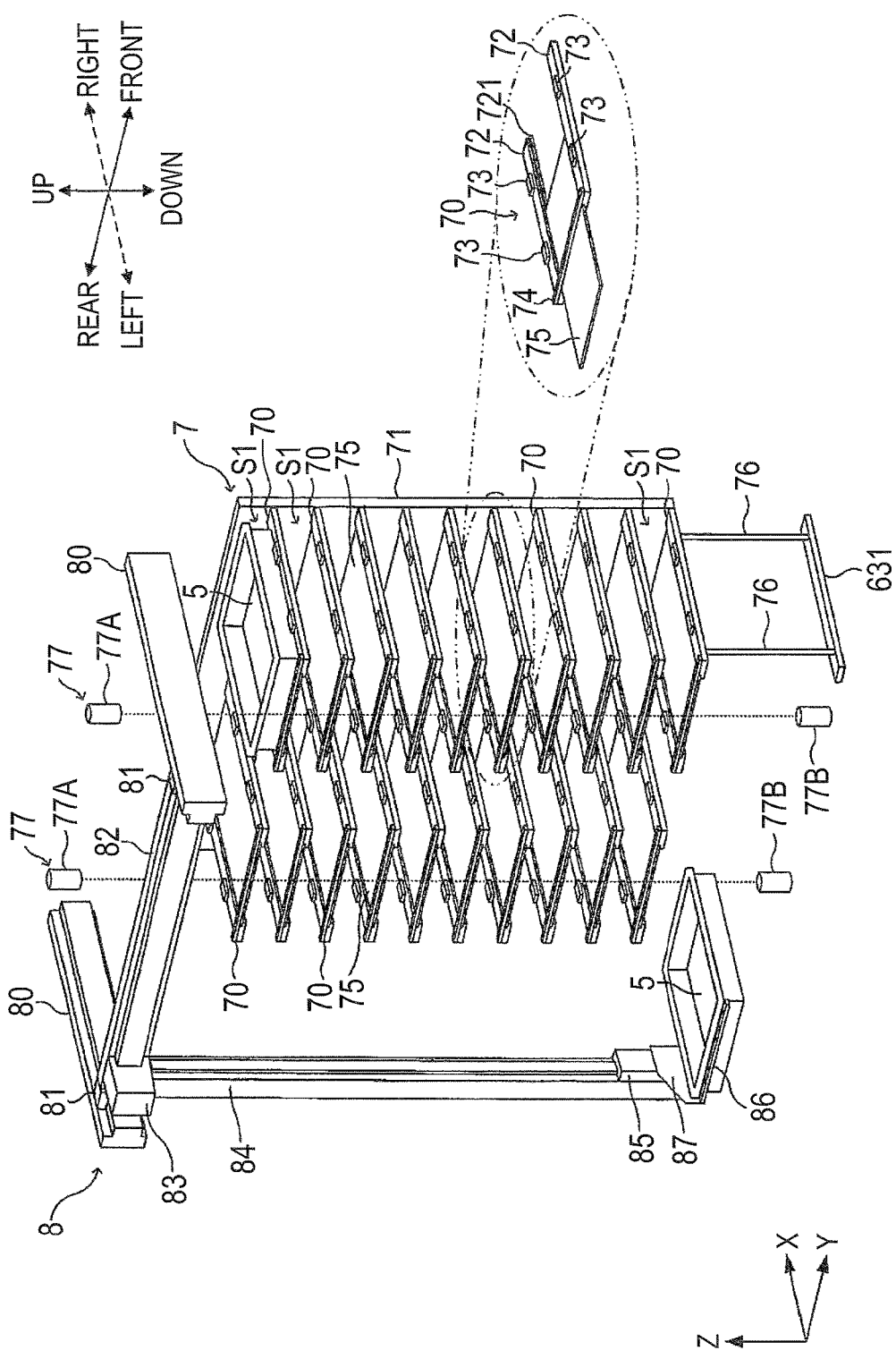
FIG. 4 is an explanatory diagram illustrating an example of each configuration of a storage rack and a taking-in-and-out device.

As illustrated in FIG. 4, the storage chamber 3 has the storage rack 7 in which mounters 70 to which the trays 5 can be placed are arranged while being stacked in multiple stages, and the taking-in-and-out device 8 that takes the tray 5 in to or out from the mounter 70. The storage rack 7 is supported by the rack moving device 9 to be described later above the conveyor devices 63 and 66. The storage rack 7 has a back plate member 71, the plurality of mounters 70 are provided so as to protrude from the back plate member 71 to the left side. A space at the upper side of each of the mounters 70, that is, a space to which the tray 5 is placed corresponds to an example of the first space S1 in which the container 55 housing the prepared liquid medicine can be stored. In the example illustrated in FIG. 4, the mounters 70 are arranged while being stacked in ten stages in the up-and-down direction, and further, these stacked mounters 70 are arranged in two columns in the front-and-rear direction. Incidentally, the arrangement configuration of the mounter 70 is not limited to the above description.

Each of the mounters 70 has a pair of frame members 72 fixed in a cantilevered shape to the back plate member 71, positioning members 73 and 74, which are provided at each upper surface of the frame members 72 and position the tray 5 to be placed, and a partition plate 75 arranged between the pair of frame members 72. The bottom portion of the tray 5 is placed on the upper surface of the frame member 72.

The positioning member 73 is provided at two positions on each upper surface of the pair of frame members 72 in this example (four positions in total). Each of the positioning members 73 is arranged near outer sides of the frame member 72, and a space into which the tray 5 is fitted is formed at an inner side thereof. In addition, the positioning member 74 is provided so as to be bridged between upper surfaces of front ends of the pair of frame members 72. As illustrated in FIG. 4, positioning of the tray 5 is set when the tray 5 is fitted into the inner side of the plurality of positioning members 73 and 74. Incidentally, the number and the arrangement of the positioning members are not limited to the above description.

The partition plate 75 is a member having a flat-plat shape, and is arranged so as to cover a lower side in a vertical direction of the tray 5, which has been placed in each of the mounter 70, so that the trays 5 stacked in the vertical direction are partitioned. The partition plate 75 is capable of being attached to and removed from the mounter 70 by being inserted into and removed from a groove section 721 formed at each of the pair of frame members 72 below the positioning member 74.

The guide member 631 of the conveyor device 63 is provided below the mounter 70 at the lowermost stage among the plurality of mounters 70 arranged on the front side. The guide member 631 is supported while being suspended by a pair of rod-like support members 76 that protrude to the lower side from the frame member 72 of the mounter 70 at the lowermost stage.

In addition, two sets of photoelectric sensors 77 are arranged in the vicinity of the storage rack 7 to correspond to the respective columns of the mounters 70 stacked in the vertical direction. Each of the photoelectric sensors 77 has a light emitting section 77A and a light receiving section 77B, and light (visible light, an infrared ray, or the like) is emitted from the light emitting section 77A in the stacked direction of the mounter 70 (that is, the vertical direction). At this time, light is not received by the light receiving section 773 in a case in which the tray 5 or the partition plate 75 is popped out to the left side from the storage rack 7 due to failure in placing the tray 5 or failure in mounting the partition plate 75 in any one of the stacked mounters 70. Accordingly, it is possible to detect the popping out of the tray 5 and the partition plate 75 from the storage rack 7. The light emitting section 77A of the photoelectric sensor 77 is installed, for example, on the ceiling surface of the casing 30 of the storage chamber 3, and the light receiving section 77B is installed, for example, on the floor surface of the casing 30.

Incidentally, the photoelectric sensor 77 is not limited to a transmission type as described above, but may be a reflection type in which a light emitting section and a light receiving section are integrated, for example. In addition, a positional relationship between the light emitting section and the light receiving section may be opposite to the above description.

The taking-in-and-out device 8 is a three-axis actuator device that can move the tray 5 in three-axis directions including an X-axis direction (right-and-left direction), a Y-axis direction (the front-and-rear direction), and a Z-axis direction (the up-and-down direction) which are orthogonal to one another. The taking-in-and-out device 8 has a pair of X-axis guide rails 80, a pair of X-axis sliders 81, a Y-axis guide rail 82, a Y-axis slider 83, a Z-axis guide rail 84, a Z-axis slider 85, and a holder 86 that holds the tray 5.

The pair of X-axis guide rails 80 is installed so as to be substantially parallel to each other in a wall section (not illustrated) on the front side and a wall section (not illustrated) on the rear side of the casing 30 of the storage chamber 3, for example. The pair of X-axis sliders 81 is fitted to the respective X-axis guide rails 80 so as to be capable of moving in the X-axis direction, and further, be restricted from moving in the Y-axis direction and the Z-axis direction. Any one of the X-axis sliders 81 is driven by a servo motor (not illustrated) along the X-axis direction. Incidentally, a clearance may be provided as appropriate between the X-axis guide rail 80, which is at a driven side at the opposite side to the side driven by the servo motor, and the X-axis slider 81, for example, in order to prevent operational failure in the X-axis direction caused by deflection or the like due to a parallel property of the pair of X-axis guide rails 80 or a device weight.

The Y-axis guide rail 82 is installed to be bridged between the pair of X-axis sliders 81. The Y-axis slider 83 is fitted to the Y-axis guide rail 82 so as to be capable of moving in the Y-axis direction, and further, be restricted from moving in the X-axis direction and the Z-axis direction. The Y-axis slider 83 is driven by the servo motor (not illustrated) along the Y-axis direction. The Z-axis guide rail 84 is provided to extend toward the lower side from the Y-axis slider 83. The Z-axis slider 85 is fitted to the Z-axis guide rail 84 so as to be capable of moving in the Z-axis direction, and further, be restricted from moving in the X-axis direction and the Y-axis direction. The Z-axis slider 85 is driven by the servo motor (not illustrated) along the Z-axis direction.

The holder 86 is installed on the front side of the Z-axis slider 85 via a mounting piece 87. The holder 86 has a substantially L shape, and holds the flanges 51 of neighboring two sides among the flanges 51 of four sides of the tray 5 having a rectangular shape (see FIG. 7 to be described later).

The taking-in-and-out device 8 having the above-described configuration moves the holder 86 holding the tray 5 to a predetermined position on the left side of the mounter 70, and then, moves the holder 86 to the right side so as to insert the tray 5 into the first space S1 when storing the tray 5 in the storage rack 7. Further, when the position of the tray 5 is at a position corresponding to the positioning members 73 and 74, the holder 86 is moved downward to place the tray 5 to the mounter 70. Thereafter, the holder 86 is moved downward by a slight amount (a distance that allows a protruding section 88 of the holder 86 to be described later to be drawn out from a concave section on a rear side of a protruding section 58 of the tray 5), and further, is slightly moved to the rear side, thereby extracting the holder 86 from the first space S1.

On the other hand, the taking-in-and-out device 8 moves the holder 86 to a predetermined position on the left side of the mounter 70 to which the tray 5 is placed, and then, moves the holder 86 to the right side so as to insert the holder 86 into the first space S1 when taking out the tray 5 from the storage rack 7. Further, when the holder 86 is slightly moved to the front side so that the position of the holder 86 is at a holding position (position at which the protruding section 88 of the holder 86 to be described later can be inserted into the concave section on the rear side of the protruding section 58 of the tray 5) of the flange 51 of the tray 5, the holder 86 is moved upward to hold the tray 5 by the holder 86. Thereafter, the holder 86 is moved upward by a slight amount (a distance that allows the avoidance of the contact between the bottom portion of the tray 5, and the positioning members 73 and 74), thereby extracting the holder 86 from the first space S1.

The operation of the taking-in-and-out device 8 described above is controlled by the controller 300 to be described later. Incidentally, the configuration mode of the storage rack 7 or the taking-in-and-out device 8 is not limited to the above description.

<5. Rack Moving Device>

Next, a description will be given regarding an example of the rack moving device with reference to FIGS. 5A and 5B. Incidentally, the door 32 of the storage chamber 3, the base member 636 of the conveyor device 63, the translation device 666 of the conveyor device 66, and the like are not illustrated in FIGS. 5A and 5B in order to prevent complexity.

Figure 5A:
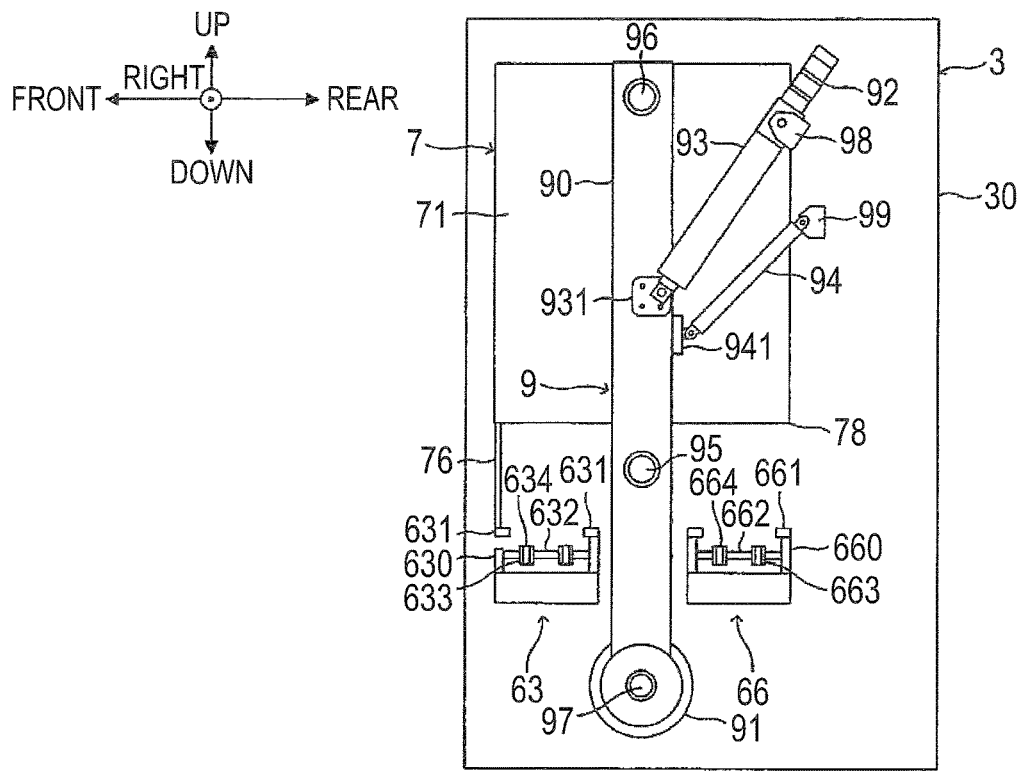
FIG. 5A is an explanatory diagram illustrating an example of a configuration of a rack moving device.
Figure 5B:
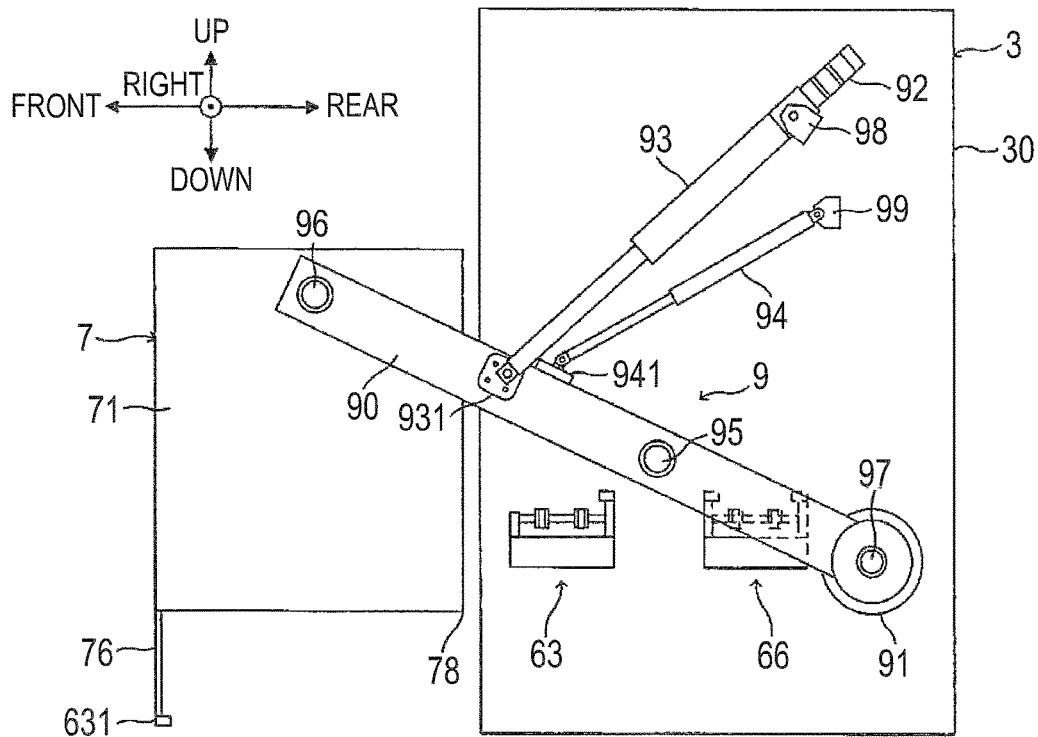
FIG. 5B is an explanatory diagram illustrating an example of a state in which the storage rack is moved to outside of a storage chamber by the rack moving device.

As illustrated in FIGS. 5A and 5B, the storage chamber 3 has the rack moving device 9 that can move the storage rack 7 inside and outside the storage chamber 3. The rack moving device 9 has an arm member 90, a weight member 91, and a power cylinder 93 including a motor 92, and an oil damper 94.

The arm member 90 has an intermediate portion being rotatably supported around a shaft 95. The shaft 95 is positioned between the conveyor devices 63 and 66 in the front-and-rear direction, and the arm member 90 is in the state of being erected between the conveyor devices 63 and 66 in the state of substantially being along the up-and-down direction. The back plate member 71 of the storage rack 7 is rotatably connected, around a rotation shaft 96, to one end portion (upper end portion) of the arm member 90. In addition, the weight member 91 is rotatably connected, around a rotation shaft 97, to the other end portion (lower end portion) of the arm member 90. The weight member 91 is configured using a plurality of ring-like members that can be attached and detached from the rotation shaft 97, for example, and it is possible to adjust the weight by increasing or decreasing the ring-like members.

One end portion of the power cylinder 93 is rotatably connected, via a mounting piece 931, between the shaft 95 and the rotation shaft 96 of the arm member 90. In addition, the other end portion of the power cylinder 93 is rotatably supported by a support member 98 fixed to the casing 30 of the storage chamber 3. The power cylinder 93 is driven to extend and contract by the motor 92 configured using, for example, a servo motor, so as cause the arm member 90 to rotationally operate around the shaft 95. On the other hand, one end portion of the oil damper 94 is rotatably connected, via a mounting piece 941, between the shaft 95 and the rotation shaft 96 of the arm member 90. In addition, the other end portion of the oil damper 94 is rotatably supported by a support member 99 fixed to the casing 30 of the storage chamber 3. The oil damper 94 applies a force in a contacting direction with respect to the arm member 90 using oil filled therein. Accordingly, a driving force caused by the power cylinder 93 at the time of rotating the arm member 90 from the up-and-down direction is reduced, and thus, it is possible to reduce the capacity of the motor 92. Incidentally, an air damper may be used instead of the oil damper.

As illustrated in FIG. 5A, the rack moving device 9 supports the storage rack 7 so as to be positioned above the conveyor devices 63 and 66 in a state in which the storage rack 7 is housed inside the storage chamber 3. At this time, the arm member 90 is substantially along the up-and-down direction, the power cylinder 93 and the oil damper 94 are in the contracted state. When the storage rack 7 is moved outside the storage chamber 3, the door 32 of the storage chamber 3 is set to be in the opened state, and then, the rack moving device 9 is driven. That is, the power cylinder 93 is extended by the motor 92 as illustrated in FIG. 5B, and accordingly, the arm member 90 rotates around the shaft 95. Further, the storage rack 7 is gradually moved outside the storage chamber 3, and the entire storage rack 7 is exposed to the outside of the storage chamber 3. Incidentally, it may be configured such that a part of the storage rack 7 is exposed to the outside of the storage chamber 3. At this time, the weight member 91 acts as a counterweight so that the rotational operation of the arm member 90 is stabilized, and further, the driving force caused by the power cylinder 93 is reduced, and thus, it is possible to reduce the capacity of the motor 92. In addition, vibration accompanying the rotational operation of the arm member 90 is absorbed by the oil damper 94, and further, the driving force of the power cylinder 93 is also reduced by an auxiliary force of the oil damper 94 as described above.

Incidentally, the rack moving device 9 and the conveyor devices 63 and 66 are arranged to in the vicinity in order to achieve reduction in size of the storage chamber 3 in the embodiment. Thus, as illustrated in FIG. 5B, a part on the weight member 91 side than the shaft 95 of the arm member 90 arrives on the transport path of the conveyor device 66 by the rotational operation described above. Accordingly, the conveyor device 66 is moved to the left end position using the translation device 666 to form the second space S2 as described above when the storage rack 7 is moved outside the storage chamber 3, and thus, it is possible to avoid the interference between the conveyor device 66 and the arm member 90 of the rack moving device 9.

In addition, a dimension in the up-and-down direction of the storage rack 7 is configured to be as large as possible in order to secure the storage space of the storage rack 7 in the embodiment. Thus, there is a possibility that a lower end portion 78 on the rear side of the storage rack 7 is in contact with the guide member 631 on the front side of the conveyor device 63 when the arm member 90 rotates in a case in which both the pair of guide members 631 of the conveyor device 63 are provided in the conveyor device 63. Accordingly, when the guide member 631 on the front side between the pair of guide members 631 of the conveyor device 63 is provided in the lower end portion of the storage rack 7 as described above, it is possible to avoid the above-described contact. As a result, it is possible to favorably operate the rack moving device 9 while securing the storage space of the storage rack 7, and further, it is possible to achieve the reduction in size of the storage chamber 3.

The operation of the rack moving device 9 described above is controlled by the controller 300 to be described later. Incidentally, the configuration mode of the rack moving device 9 is not limited to the above description. For example, the weight member 91 or the oil damper 94 may not be necessarily provided, and it is possible to configure the rack moving device 9 as a device without the weight member 91 and the oil damper 94.

<6. Tray and Holding Section>

Next, a description will be given regarding examples of the tray and the holder of the taking-in-and-out device with reference to FIGS. 6A to 7B. Incidentally, FIG. 6A illustrates an example of the housed material of the tray 5 to be used in the preparation work, and FIG. 6B illustrates an example of the housed material of the tray 5 after being used in the preparation work.

Figure 6A:
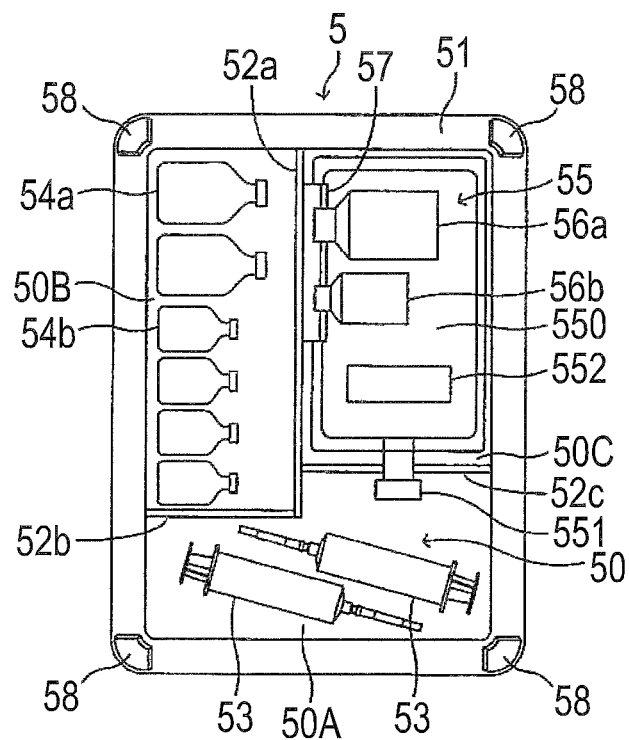
FIG. 6A is an explanatory diagram illustrating an example of a housed material of a tray before being used for preparation work.
Figure 6B:
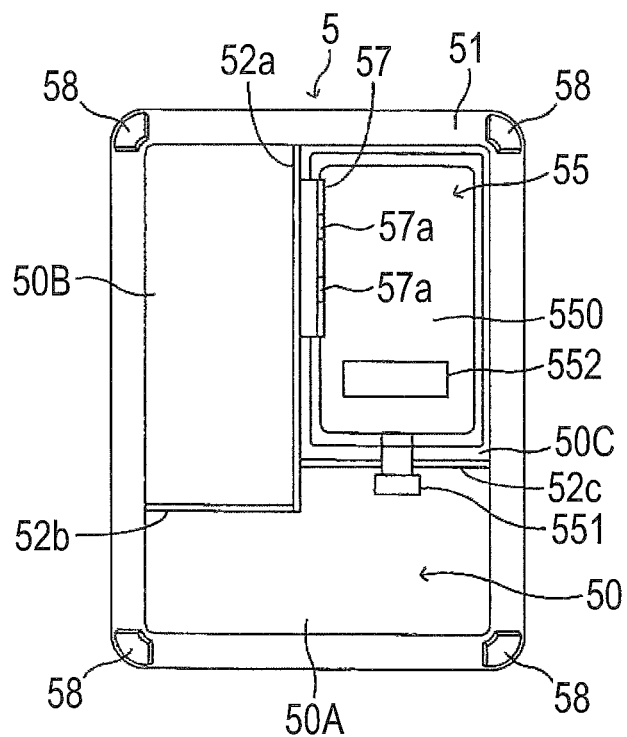
FIG. 6B is an explanatory diagram illustrating an example of a housed material of a tray after being used for the preparation work.

As illustrated in FIGS. 6A and 6B, the tray 5 is a container having a substantially rectangular shape in a plan view, and has a main body section 50 and the flange 51. A plurality of partition plates 52a, 52b and 52c are arranged in the main body section 50, and the inside of the main body section 50 is partitioned into a plurality of housing areas 50A, 50B and 50C by the partition plates 52a to 52c. For example, the housing area 50A is an area in which the syringe 53 is housed, the housing area 50B is an area in which a plurality of medicinal-agent containers 54a and 54b are housed, and the housing area 50C is an area in which the bag 55 and the plurality of bottles 56a and 56b are housed.

The bag 55 has a bag body 550 and a port member 551. When the port member 551 is engaged with a notch (not illustrated) of the partition plate 52c, the bag 55 is positioned in the housing area 50C. In addition, a fixing member 57 in which a plurality of notches 57a are formed is provided in the partition plate 52a. When being engaged with the notch 57a of the fixing member 57, the bottles 56a and 56b are positioned so as to expose an identification display section 552 (for example, barcode or the like) of the bag 55, and are arranged at an upper part of the bag 55. Incidentally, the syringe 53 and the medicinal-agent containers 54a and 54b are also positioned by a positioning member (not illustrated) although not illustrated.

In the example illustrated in FIG. 6A, the tray 5 before being subjected to the preparation work houses the two syringes 53, the two medicinal-agent containers 54a and the four medicinal-agent containers 54b, the bag 55, the two bottles 56a and 56b as examples of the plurality of tools to be used in the preparation work. An infusion solution such as a saline solution or a glucose solution is filled in the bag 55, and an infusion solution different from that of the bag 55, for example, is filled in the bottles 56a and 56b. In addition, a powder-like or liquid-like medicinal agent is filled in the medicinal-agent containers 54a and 54b. The robot 100 executes one-time preparation work using these tools. In other words, the tools to be used in the preparation work are housed in the respective trays 5 for each one-set of tools, while setting predetermined tools to be used in one-time preparation work as the single set.

Incidentally, the single set of tools is not limited to the above description, and may be some of the tools described above, or may be tools other than the tools described above. In addition, it is not necessarily limited to a case in which one-time preparation work is performed using one of the trays 5. For example, one-time preparation work may be executed using tools housed in the plurality of trays 5 in a case in which the amount of the liquid medicines to be prepared is large, and the infusion solution or the medicinal agent is insufficient only using tools housed in the one tray 5.

In the example illustrated in FIG. 6B, the tray 5 after being subjected to the preparation work houses the bag 55 as the container that houses the prepared liquid medicine. The prepared liquid medicine is returned and filled in the bag 55. The tools other than the bag 55 are discarded into a disposal box in the preparation chamber 4, for example. Incidentally, the container that houses the liquid medicine is not limited to the bag 55, but may be the bottles 56a and 56b or may be the syringe 53, for example.

The protruding sections 58, for example having a substantially fan shape are formed at four corners of the flange 51 of the tray 5. Each rear side of the protruding sections 58 is formed in the concave section having the same shape, for example. On the other hand, as illustrated in FIG. 7A, the holder 86 of the taking-in-and-out device 8 has the substantially L shape, and both end portions thereof have the protruding sections 88 having shapes corresponding to the concave sections on the rear side of the protruding sections 58 of the tray 5 described above. When the tray 5 is held by the holder 86, the protruding section 88 of the holder 86 is fitted to the concave section on the rear side of the protruding section 58 at the position corresponding to the flange 51 of the tray 5, thereby positioning the tray 5.

At this time, the tray 5 is supported by two corners on a diagonal line, and thus, there is a possibility that the tray 5 is rolled over about the diagonal line to be overturned depending on a barycentric position of the tray 5, and the tray 5 drops from the holder 86. Thus, the taking-in-and-out device 8 has an air cylinder 89. The air cylinder 89 is installed in, for example, the Z-axis slider 85 or the mounting piece 87. The air cylinder 89 retracts a pin 89a in a state in which the holder 86 does not hold the tray 5 as illustrated in FIG. 7A, and the air cylinder 89 causes the pin 89a to protrude such that the pin 89a is engaged with the flange 51 in a state in which the tray 5 is held by the holder 86 as illustrated in FIG. 7B. Accordingly, it is possible to prevent the above-described rollover.

Incidentally, a driving mechanism or a driving source for preventing the above-described rollover is not limited to the air cylinder. For example, another driving mechanism or driving source may be used as long as a mechanism that is capable of causing protrusion of a pin such as an electric cylinder, a hydraulic cylinder, a servo motor, or the like.

Incidentally, the configuration mode of the tray 5 is not limited to the above description. For example, a tray other than the tray having a rectangular shape in a plan view may be used. In addition, the inside of the main body section 50 may be partitioned into the larger numbers of housing areas, and it may be configured such that the partition plate is not provided, and the housing area is not partitioned. In addition, the configuration mode of the holder 86 is also not limited to the above description.

<7. Cover of Preparation Chamber>

Next, a description will be given regarding an example of the cover 110 installed in the preparation chamber 4 with reference to FIGS. 8A and 8B.

As described above, the cover 110 that covers each upper side of the conveyor devices 67 and 68, and the motor roller device 69 is provided in the preparation chamber 4. As illustrated in FIGS. 8A and 8B, the cover 110 is a cover that has a top plate 111 at the upper side, side plates 112 and 113 on the front side and the rear side, and side plates 114 and 115 on the right side and the left side, and has a substantially a rectangular parallelepiped shape of which the lower side is opened. An opening 116 corresponding to the shutter 7C and an opening 117 corresponding to the shutter 7D are formed in the side plate 114. The conveyor device 67 arranged on the front side of the cover 110 receives the tray 5, which has been passed from the conveyor device 64 of the storage chamber 3, in the cover 110 through the opening 116. In addition, the conveyor device 68 arranged on the rear side in the cover 110 passes the tray 5 to the conveyor device 65 of the storage chamber 3 through the opening 117.

An opening 118 for allowing the robot 100 to access the tray 5 is formed on each rear side of the top plate 111 and the side plates 114 and 115 of the cover 110. The opening 118 is formed above the conveyor device 68. In addition, the cover 110 has a shutter 119 that can open and close the opening 118. The shutter 119 may be automatically opened and closed using a power source, for example, a servo motor, a hydraulic cylinder, an air cylinder, or the like, and may be configured to be opened and closed by the robot 100 using the hands 120L and 120R without using such a power source.

Figure 8A:
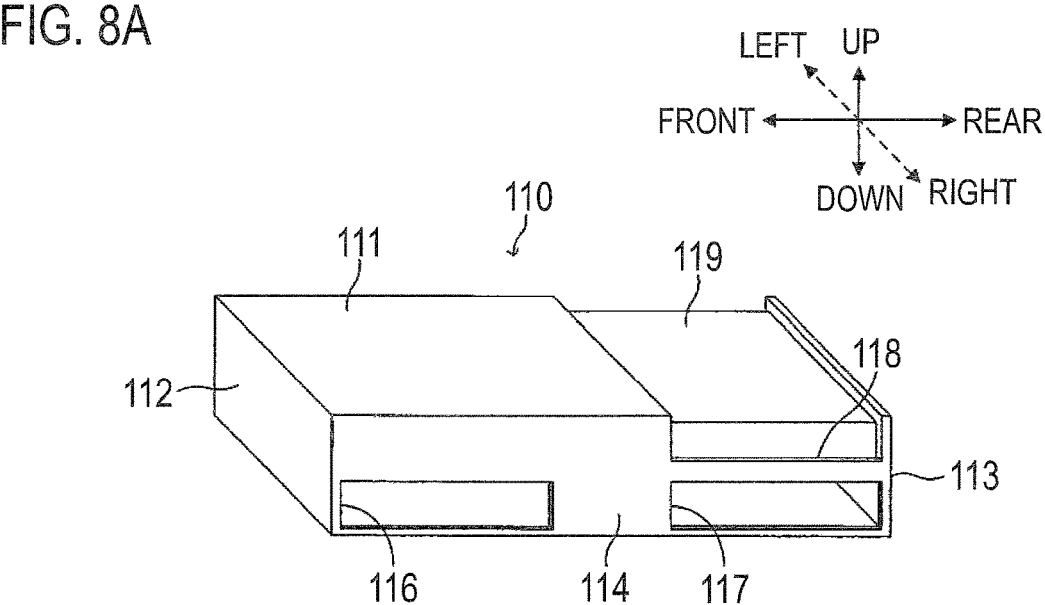
FIG. 8A is an explanatory diagram illustrating an example of a configuration of a cover in a state in which a shutter is closed.
Figure 8B:
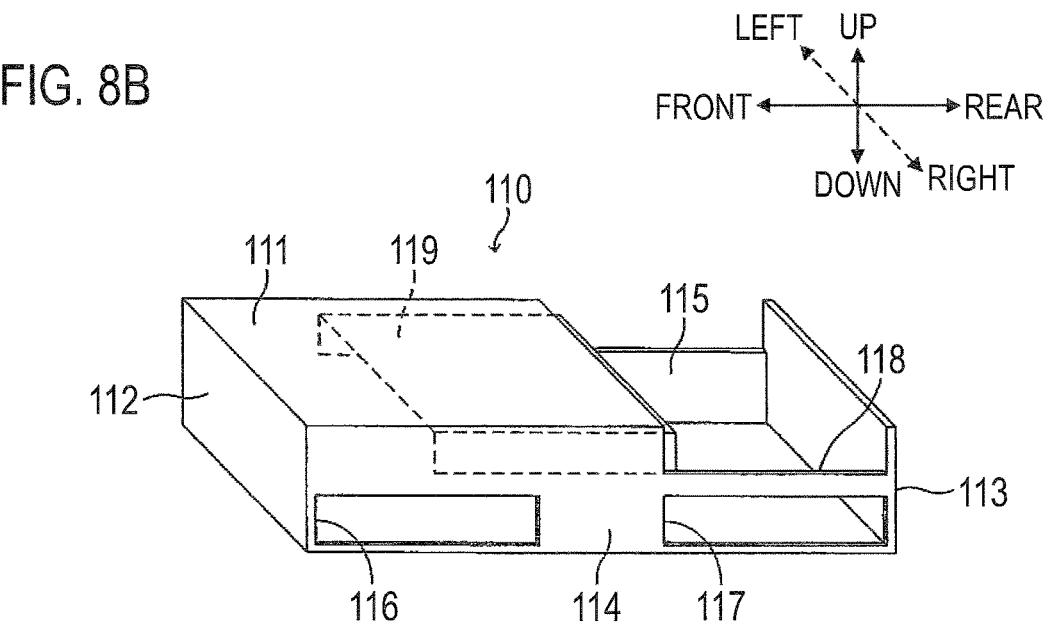
FIG. 8B is an explanatory diagram illustrating an example of the configuration of the cover in a state in which the shutter is opened.

When the conveyor device 67 receives the tray 5 from the conveyor device 64 of the storage chamber 3, the opening 118 is closed by the shutter 119 as illustrated in FIG. 8A. Further, the tray 5 is transported from the conveyor device 65 to the conveyor device 68 by the motor roller device 69 in such a state in which the shutter 119 is closed. When the tray 5 arrives on the conveyor device 68, the tray 5 is stopped at the position, and the shutter 119 is opened so that the opening 118 is opened as illustrated in FIG. 8B. Accordingly, the robot 100 can take out the tool housed in the tray 5 using the hands 120L and 120R, and can execute the preparation work of the liquid medicine. In parallel with the preparation work, the conveyor device 67 receives the subsequent tray 5 from the conveyor device 64 of the storage chamber 3, and causes the corresponding tray 5 to wait on the conveyor device 67. At this time, since each upper side of the conveyor device 67 and the motor roller device 69 are covered by the top plate 111 although the opening 118 is opened, it is possible to prevent a foreign substance (for example, the infusion solution, the medicinal agent, the prepared liquid medicine, a cleaning liquid, trash, dust, or the like) floating in the preparation chamber 4 from riding on the downdraft and being mixed in to the tray 5 in the middle of the waiting.

When the preparation work ends, the robot 100 houses the container 55 that housing the prepared liquid medicine in the tray 5 through the opening 118. Further, the shutter 119 is closed, and the conveyor device 68 passes the tray 5, in which the container 55 is housed, to the conveyor device 65 of the storage chamber 3 through the opening 117. Thereafter, the tray 5 which has waited on the conveyor device 67 is transported to the conveyor device 68 by the motor roller device 69, and then, the shutter 119 is opened so that the opening 118 is opened. Accordingly, the robot 100 becomes a state of being capable of performing the preparation work of the subsequent liquid medicine.

In this manner, the shutter 119 of the cover 110 is opened in a case in which the preparation work is executed by the robot 100. Incidentally, the shutter 119 may be opened only when the robot 100 accesses the tray 5, and the shutter 119 may be closed while the robot 100 does not access the tray 5 (for example, while the preparation work is executed on the workbench 46) even in the middle of executing the preparation work.

Incidentally, the configuration mode of the cover 110 is not limited to the above description. For example, it may be configured such that the cover 110 is opened without providing the side plate 114 on the right side, and the wall section 45 of the casing 40 of the preparation chamber 4 is used.

<8. Controller>

Figure 9:
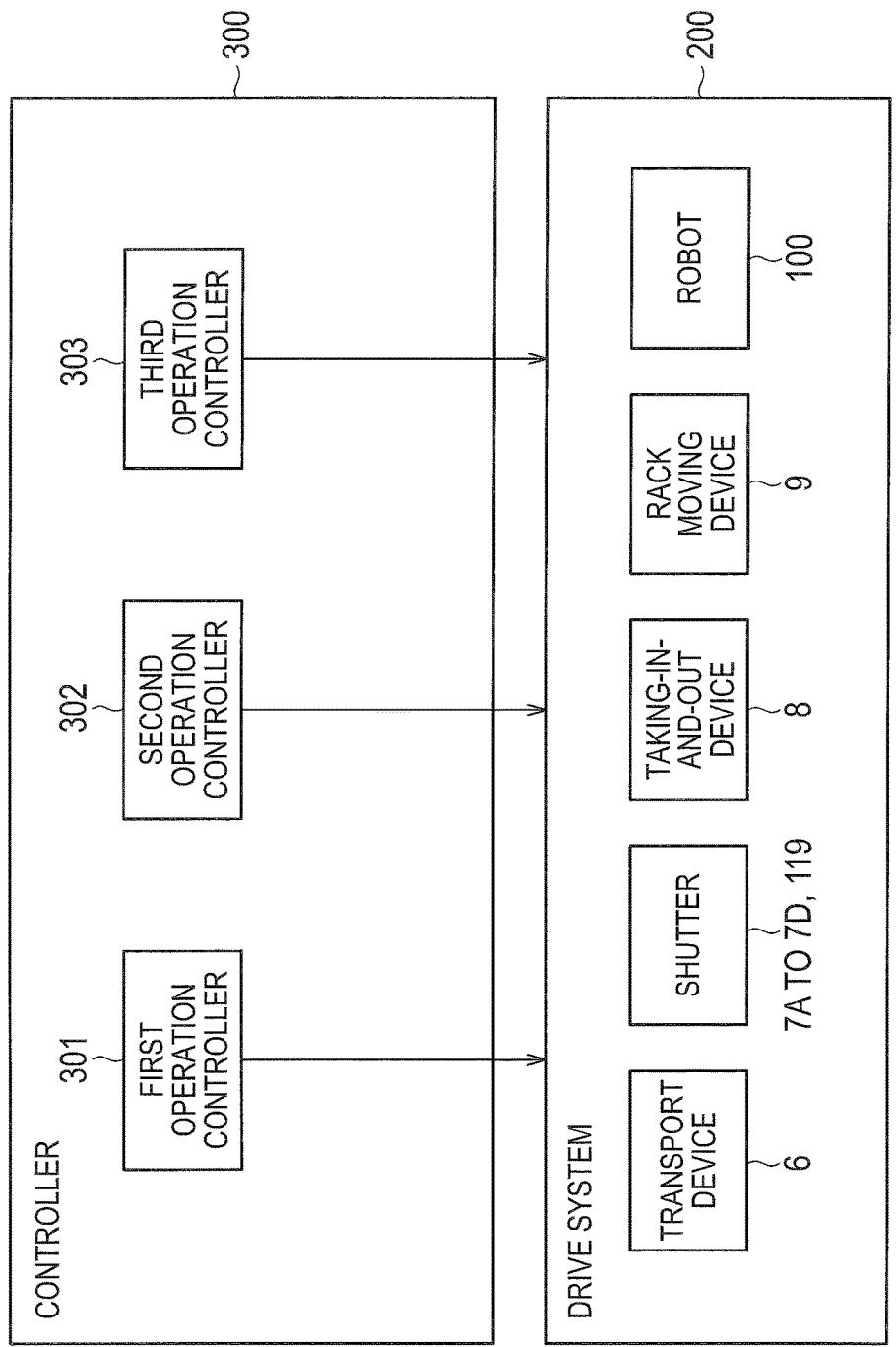
FIG. 9 is an explanatory diagram illustrating an example of a functional configuration of a controller.

Next, a description will be given regarding an example of a functional configuration of the controller 300 with reference to FIG. 9.

The liquid medicine preparation system 1 has the controller 300. The controller 300 collectively controls an operation of a drive system 200 provided in the liquid medicine preparation system 1. The drive system 200 includes the transport device 6, the shutters 7A to 7D and 119, the taking-in-and-out device 8, the rack moving device 9, the robot 100, and the like. As illustrated in FIG. 9, the controller 300 has a first operation controller 301, a second operation controller 302, and a third operation controller 303.

The first operation controller 301 controls the rack moving device 9 such that the storage rack 7 is moved outside the storage chamber 3 in a case in which the preparation work is completed for all the trays 5, in which the tools to be used in the preparation work are housed, stored in the storage rack 7, and storing of all the trays 5, in which the containers 55 housing the prepared liquid medicine are housed, in the storage rack 7 is completed.

The first operation controller 301 controls an operation at a normal time of the drive system 200. A description will be given in detail regarding an example of the operation of the drive system 200 according to the first operation controller 301.

First, the user M houses the predetermined tools among the plurality of tools to be used in the preparation work as a single set in the tray 5 in the preparatory chamber 2 (the setting work). The tray 5 at this time is in a state as illustrated in FIG. 6A, for example. The tray 5, in which the one-set of the predetermined tools is housed, is transported by the motor roller device 61, and is stopped in front of the closed shutter 7A. When the shutter 7A is opened, the tray 5 is passed from the motor roller device 61 to the conveyor device 63 of the storage chamber 3 through the opening 271. The shutter 7A is closed immediately after the tray 5 is passed therethrough. The tray 5 is transported by the conveyor device 63 to be passed to the conveyor device 64. At this time, the conveyor device 64 is at the lower end position. The tray 5 is stopped on the conveyor device 64, and the conveyor device 64 ascends to be at the upper end position.

In such a state, the taking-in-and-out device 8 moves the holder 86 toward the tray 5 on the conveyor device 64 at the upper end position, and holds the tray 5. Further, the taking-in-and-out device 8 moves the holder 86 that holding the tray 5 to a predetermined one of the mounters 70, and places the tray 5 to the mounter 70. By repeating the above-described operations, the trays 5 before being used in the preparation work are sequentially stocked in the storage rack 7. The user M sets the required number of the trays 5. For example, the setting work of the tray 5 may be repeated until the storage rack 7 is full.

It is not necessary for the user M to perform work basically after the storing of the tray 5 before being subjected to the preparation in the storage rack 7 is completed, and an unattended operation is possible. That is, the taking-in-and-out device 8 moves the holder 86 to the predetermined mounter 70 to which the tray 5 is placed, holds the tray 5 by the holder 86, and takes out the tray 5 from the storage rack 7. This taking-out work of the tray 5 is executed according to a schedule that is set in advance, for example. Further, the conveyor device 64 ascends to be at the upper end position, and the taking-in-and-out device 8 places the tray 5 taken out from the storage rack 7 onto the conveyor device 64 at the upper end position.

The tray 5 waits on the conveyor device 64, and then, the tray 5 is passed from the conveyor device 64 to the conveyor device 67 of the preparation chamber 4 through the opening 451 when the closed shutter 7C is opened. The shutter 7C is closed immediately after the tray 5 is passed therethrough. The tray 5 is transported from the conveyor device 65 to the conveyor device 68 by the motor roller device 69 in the cover 110, and is stopped on the conveyor device 68. Further, the shutter 119 is opened, and the opening 118 is opened. The robot 100 takes out the tool housed in the tray 5 using the hands 120L and 120R, and performs the preparation work of the liquid medicine. Incidentally, in parallel with this preparation work, the subsequent tray 5 is taken out from the storage rack 7, is passed from the conveyor device 64 to the conveyor device 67, and waits on the conveyor device 67 in the case of continuously performing the preparation work.

The robot 100 houses the container 55 housing the prepared liquid medicine in the tray 5 through the opening 118 when the preparation work ends. The tray 5 at this time is in a state as illustrated in FIG. 6B, for example. Further, the shutter 119 is closed. Further, the conveyor device 65 of the storage chamber 3 ascends to be at the upper end position. Further, the conveyor device 68 passes the tray 5, in which the container 55 is housed, to the conveyor device 65 at the upper end position through the opening 452 when the shutter 7D is opened.

In such a state, the taking-in-and-out device 8 moves the holder 86 toward the tray 5 on the conveyor device 65 at the upper end position, and holds the tray 5. Further, the taking-in-and-out device 8 moves the holder 86 that holds the tray 5 to a predetermined one of the mounters 70, and places the tray 5 to the mounter 70. Further, the tray 5 which has waited on the conveyor device 67 is transported to the conveyor device 68 by the motor roller device 69, the shutter 119 is opened, and the opening 118 is opened. Further, the robot 100 executes the subsequent preparation work of the liquid medicine using the tool housed in the tray 5.

By repeating the above-described operations, the trays 5 after being subjected to the preparation work are sequentially stocked in the storage rack 7. In other words, the trays 5 that house the tools for the preparation work are sequentially exchanged with the trays 5 that house the container 55 of the prepared liquid medicine in the storage rack 7. Further, the above-described operations are repeated until the preparation work is complete for all the trays 5 before being subjected to the preparation work, and the storing of all the trays 5 after being subjected to the preparation work in the storage rack 7 is completed. Incidentally, the robot 100 basically executes the one-time preparation work using the tool housed in the single tray 5. However, in a case in which the robot 100 executes one-time preparation work using the plurality of trays 5, the container 55 that houses the liquid medicine is housed in at least any one of the plurality of trays 5.

The above-described operations are executed by the unattended operation. Further, the user M executes a predetermined operation using an operation panel or the like, for example, at the time of taking out the liquid medicine. Accordingly, it is possible to confirm the closed states of the shutters 7A to 7D. Further, the user M opens the door 32 of the storage chamber 3. In this state, the power cylinder 93 of the rack moving device 9 is extended by the motor 92, the arm member 90 rotates around the shaft 95, and the storage rack 7 moves outside the storage chamber 3. Accordingly, the user M can collectively take out the prepared liquid medicine from the storage rack 7.

In addition, the second operation controller 302 controls the taking-in-and-out device 8 such that a specific one of the trays 5 among the trays 5, in which the container 55 are housed, stored in the storage rack 7 is taken out from the storage rack 7 in response to a request of the user M.

The second operation controller 302 controls an operation at the time of emergency of the drive system 200. A description will be given in detail regarding an example of the operation of the drive system 200 according to the second operation controller 302.

The operation according to the second operation controller 302 is the same as the operation according to the first operation controller 301 described above in terms of an operation in which the storing of the tray 5 before being subjected to the preparation in the storage rack 7 is completed, thereafter, the preparation work is executed for each of the trays 5, and the trays 5 after being subjected to the preparation work are sequentially stocked in the storage rack 7. Here, the user M executes a predetermined operation using, for example, an operation panel or the like in a case in which there is a request of taking out a specific liquid medicine among the liquid medicines stored in the storage rack 7 before the entire preparation work is completed, for example. Accordingly, the taking-in-and-out device 8 moves the holder 86 to a predetermined one of the mounters 70 to which the tray 5 intended to be taken out is placed, holds the tray 5 by the holder 86, and takes out the tray 5 from the storage rack 7. Further, the conveyor device 65 ascends to be at the upper end position, and the taking-in-and-out device 8 places the tray 5 taken out from the storage rack 7 onto the conveyor device 65 at the upper end position.

Next, the conveyor device 65 descends to be at the lower end position. Further, the tray 5 is transported by the conveyor device 65 to be passed to the conveyor device 66. The conveyor device 65 transports the tray 5 in front of the shutter 7B while performing the translational operation. When the shutter 7B is opened, the tray 5 is passed from the conveyor device 66 to the motor roller device 62 of the preparatory chamber 2 through the opening 272. The shutter 7B is closed immediately after the tray 5 is passed therethrough. The tray 5 is transported by the motor roller device 62 to be passed to the user M. In the case of taking out a plurality of the liquid medicines, the above-described operations are repeated. Accordingly, the user M can take out the specific liquid medicine from the storage rack 7. Incidentally, the above-described operations can be executed after the entire preparation work is completed.

In addition, the third operation controller 303 performs control, in response to a request of the user M, such that the tray 5 to which the tool has been set in the preparatory chamber 2 is transported to the preparation chamber 4 without being stored in the storage chamber 3 so as to perform the preparation work, and the tray 5, in which the container 55 of the prepared liquid medicine is housed, is transported to the preparatory chamber 2 without being stored in the storage chamber 3.

The third operation controller 303 controls an operation at the time of emergency different from that of the drive system 200. A description will be given in detail regarding an example of the operation of the drive system 200 according to the third operation controller 303.

The user M executes a predetermined operation using, for example, an operation panel or the like, and then, sets a predetermined tool to the tray 5 in a case, for example, in which there is a request by the user M of urgently performing different preparation of a specific liquid medicine from the preparation work for the tray 5 stored in the storage rack 7. This tray 5 is transported to the conveyor device 64 as similar to the operation according to the first operation controller 301 described above. Further, the tray 5 is stopped on the conveyor device 64, and the conveyor device 64 ascends to be at the upper end position. At this time, the tray 5 is passed directly to the conveyor device 67 of the preparation chamber 4 without storing the tray 5 in the storage rack 7 by driving the taking-in-and-out device 8. Further, similar to the operation according to the first operation controller 301 described above, the tray 5 is transported to the conveyor device 68 in the cover 110, the shutter 119 is opened, and then, the robot 100 performs the preparation work of the liquid medicine.

After the robot 100 ends the preparation work, the tray 5 that houses the container 55 of the prepared liquid medicine is passed from the conveyor device 68 to the conveyor device 65 at the upper end position as similar to the operation according to the first operation controller 301 described above. At this time, the conveyor device 65 descends to be at the lower end position, and the tray 5 is passed the conveyor device 66 without storing the tray 5 in the storage rack 7 by driving the taking-in-and-out device 8. The subsequent operations are the same as those of the second operation controller 302 described above, and the tray 5 is passed from the conveyor device 66 to the motor roller device 62 of the preparatory chamber 2 to be passed to the user M. In the case of performing preparation of the plurality of liquid medicines, the above-described operations are repeated. Accordingly, the user M can urgently perform the preparation of the specific liquid medicine.

Incidentally, processes according to the operation controllers 301 to 303 described above and the like are not limited to such a case in which the processes are shared by the three units, but may be processed, for example, using one processor, or may be processed using further subdivided processors. In addition, each function of the controller 300 may be implemented by a program executed by a CPU 901 (see FIG. 10) to be described later, or some of or all the functions may be implemented by an actual device such as an application-specific integrated circuit (ASIC) or a field-programmable gate array (FPGA) 907 (see FIG. 10), or other electrical circuits.

<9. Example of Effect According to Embodiment>

As described above, the liquid medicine preparation system 1 of the embodiment has the preparation chamber 4 and the storage chamber 3. The storage chamber 3 has the plurality of first spaces S1 that can store the container 55 housing the prepared liquid medicine prepared in the preparation chamber 4. Accordingly, since it is possible to stock a plurality of the prepared containers 55 in the storage chamber 3 even in the case, for example, of continuously performing the preparation work, it is possible to reduce the work (for example, the taking-out work of the container 55 performed every time the preparation work is performed, and the like) performed by the user M. Accordingly, it is possible to promote the automation of the liquid medicine preparation system 1. In addition, there is also an effect of facilitating the management of the prepared liquid medicine, for example, by associating a type or the like of the liquid medicine with the first space S1.

In addition, in the embodiment, it is possible to stock the plurality of containers 55 in the storage rack 7 in the unit of the tray even in the case of continuously performing the preparation work, for example, in a case in which the storage chamber 3 has the storage rack 7 in which the mounters 70 to which the tray 5 housing the container 55 can be placed are arranged while being stacked in the multiple stages, and the taking-in-and-out device 8 that can take the tray 5 in to and out from the mounter 70. In addition, since it is possible to take the tray 5 in to and out from an arbitrary one of the mounters 70 of the storage rack 7 using the taking-in-and-out device 8, it is possible to further promote the automation. In addition, since the containers 55 are stored in the storage rack 7 in the unit of the tray, it is possible to improve a handling property of the prepared liquid medicine.

In addition, in the embodiment, it is possible to collectively take out the prepared liquid medicine from the storage rack 7 by moving the storage rack 7 outside the storage chamber 3 when the entire preparation work is completed, for example, in a case in which the storage chamber 3 has the rack moving device 9 that moves the storage rack 7 outside and inside the storage chamber 3. Accordingly, the taking-out work is facilitated, and it is possible to shorten the work time.

In addition, the following effect is obtained in the embodiment in a case in which the taking-in-and-out device 8 has the holder 86, which is supported to be movable in the three-axis directions that are orthogonal to one another, and has the substantially L shape that holds the flange 51 of the tray 5. That is, when the holder 86 has the substantially L shape, it is possible to reduce the moving amount (escaping amount) in the Y-axis direction when the holder 86 is drawn out from the mounter 70 after the tray 5 is placed to the mounter 70 as compared to a case in which the holder 86 has a U shape, for example. Accordingly, it is possible to reduce a dimension in the Y-axis direction (the dimension in the front-and-rear direction) of the storage rack 7, and thus, it is possible to reduce the size of the liquid medicine preparation system 1.

In addition, the following effect is obtained in the embodiment in a case in which the mounter 70 has the partition plate 75 that covers the lower side in the vertical direction of the placed tray 5, and can be attached to and detached from the mounter 70. That is, the trays 5 placed to the respective mounters 70 are partitioned by the partition plate 75. Accordingly, it is possible to prevent contamination caused when a foreign substance (for example, the infusion solution, the medicinal agent, the prepared liquid medicine, a cleaning liquid, trash, dust, or the like) drops from the tray 5 arranged at the upper stage onto the tray 5 at the lower side. In addition, the respective partition plates 75 are provided so as to be attached to and detached from the mounter 70, and thus, can be easily cleaned up. Further, it is possible to arrange the single tray 5 using the plurality of first spaces S1 of the mounters 70 by detaching the partition plate 75 from some of the mounters 70 in the storage rack 7. As a result, it is possible to store the tray 5 in which a tool with a higher height than an interval between the mounters 70 is arranged.

In addition, the following effect is obtained in the embodiment in a case in which the liquid medicine preparation system 1 has the photoelectric sensor 77, which is arranged in the vicinity of the storage rack 7 and detects the popping out of the tray 5 and the partition plate 75 from the storage rack 7 by emitting the light to the stacking direction of the mounter 70. That is, there is a possibility that the tray 5 or the partition plate 75 drop to be brought into contact with a peripheral equipment when the storage rack 7 is moved in a case in which at least any one of the tray 5 and the partition plate 75 is popped out form the storage rack 7 without being properly stored in or mounted to the storage rack 7. Since the popping out of the tray 5 and the partition plate 75 from the storage rack 7 is detected by the photoelectric sensor 77 in the embodiment, it is possible to prevent the above-described drop and contact. In addition, since the photoelectric sensor 77 is provided so as to emit the light in the stacking direction of the mounter 70, it is possible to monitor the popping out in the plurality of mounters 70 using a single sensor, and it is possible to save the number of sensors.

In addition, the following effect is obtained in the embodiment in a case in which the rack moving device 9 has the arm member 90 of which the intermediate portion is rotatably supported and one end portion is connected with the storage rack 7, the weight member 91 connected to the other end portion of the arm member 90, and the motor 92 that causes the arm member 90 to rotationally operate. That is, the rack moving device 9 rotates the arm member 90 using the motor 92 to move the storage rack 7 connected to the one end portion thereof inside and outside the storage chamber 3. At this time, since the weight member 91 connected to the other end portion of the arm member 90 acts as the counterweight, it is possible to reduce the motor capacity of the motor 92 while stabilizing the rotational operation.

In addition, the following effect is obtained in the embodiment in a case in which the second space S2 that avoids the interference with the arm member 90 is formed in the transport path when the liquid medicine preparation system 1 has the conveyor device 66, which is arranged in the storage chamber 3 and transports the tray 5, and the conveyor device 66 performs the reciprocating movement in the transport direction. That is, since the arm member 90 of the rack moving device 9 rotationally operates, there is a possibility that the arm member 90 and the conveyor device 66 interfere with each other in a case in which the rack moving device 9 and the conveyor device 66 are arranged in the vicinity. On the other hand, the increase in size of the liquid medicine preparation system 1 is introduced in a case in which the rack moving device 9 and the conveyor device 66 are arranged to be spaced apart from each other in order to avoid the interference. The conveyor device 66 performs the reciprocating movement in the transport direction. Accordingly, it is possible to avoid the interference between the arm member 90 and the conveyor device 66 while reducing the size of the system by arranging the rack moving device 9 and the conveyor device 66 in the vicinity.

In addition, the following effect is obtained in the embodiment in a case in which the storage rack 7 places the trays 5, in which the plurality of tools to be used in the preparation work are housed for each single set, the single set having the predetermined tools, to the mounter 70. That is, not only the tray 5 that houses the prepared medicinal-liquid container 55 but also the tray 5 that houses the single set of the tools to be used in the preparation work is stored in the storage rack 7. Accordingly, since it is possible to stock the tools necessary for the respective preparation work in the storage rack 7 in advance even in the case, for example, of continuously performing the preparation work, it is possible to reduce the work (for example, the setting work of the tools for each preparation work, and the like) performed by the user M. Accordingly, it is possible to promote the automation of the liquid medicine preparation system 1. In addition, the management of the tools is facilitated by storing the trays 5 by allowing the single set of the tools in correspondence with the preparation work that uses the corresponding set one by one, and it is possible to reduce an error or a shortage of the tool. Further, the management of the tools before being subjected to the preparation is facilitated by associating the single set of tools to be used in each preparation work with each of the mounters 70.

In addition, in the embodiment, it is possible to handle even a case in which the amount of the liquid medicine to be prepared is large, and only the tools housed in the single tray 5 are not sufficient (in the infusion solution or the medicinal agent, for example) using the tools of the plurality of trays 5 in a case in which the robot 100 executes the one-time preparation work using the tools housed in the plurality of trays 5 placed to the storage rack 7.

In addition, the following effect is obtained in the embodiment in a case in which the liquid medicine preparation system 1 has the conveyor devices 64 and 67, which load the tray 5 housing the tool from the storage chamber 3 to the preparation chamber 4, and the conveyor devices 68 and 65, which are arranged in the different path from that of the conveyor devices 64 and 67, and unload the tray 5 housing the container 55 from the preparation chamber 4 to the storage chamber 3. In a case in which the loading path and the unloading path of the tray 5 between the storage chamber 3 and the preparation chamber 4 are provided as the same path, the loading of the tray 5 housing the tool to the preparation chamber 4 can be started only after the unloading of the tray 5 housing the container 55 from the preparation chamber 4 to the storage chamber 3 is completed after the preparation work ends. Accordingly, the waiting time between the preparation work and the preparation work performed by the robot 100 increases. The loading path and the unloading path are provided as the different paths in the embodiment. Accordingly, it is possible to load the tray 5 housing the tool from the storage chamber 3 to the preparation chamber 4 in parallel with the unloading of the tray 5 housing the container 55 from the preparation chamber 4 to the storage chamber 3 after the preparation work ends. Accordingly, it is possible to shorten the waiting time between the preparation work and the preparation work, and thus, it is possible to widely shorten the total work time in the case of continuously performing the preparation work.

In addition, the following effect is obtained in the embodiment in a case in which the liquid medicine preparation system 1 further has the cover 110, which is arranged in the preparation chamber 4 and covers the loading position of the tray 5 using the conveyor devices 64 and 67 and the unloading position of the tray 5 using the conveyor devices 68 and 65, and the cover 110 has the opening 118 that allows the robot 100 to access the tray 5, and the shutter 119 that opens and closes the opening 118. That is, in a case in which the loading path and the unloading path are provided as the different paths, it is considered that the tray 5 for the subsequent preparation work is loaded and caused to wait in the preparation chamber 4 in the middle of the preparation work. In this case, it is possible to start the subsequent preparation work immediately after the prior preparation work is completed, and thus, it is possible to shorten the waiting time. However, there is a risk of causing the contamination by allowing the foreign substance (for example, the infusion solution, the medicinal agent, the prepared liquid medicine, a cleaning liquid, trash, dust, or the like) existing in the preparation chamber 4 to drop in the tray 5 caused to wait in such a case. Since it is possible to cover the tray 5 waiting at the loading position using the cover 110 in the embodiment, it is possible to prevent the above-described contamination. In addition, since the access of the robot 100 is possible when the tray 5 is transported to an opening portion of the cover 110 at the time of starting the preparation work, it is possible to promptly start the preparation work.

In addition, the following effect is obtained in the embodiment in a case in which the liquid medicine preparation system 1 has the controller 300 and the controller 300 has the first operation controller 301 that controls the rack moving device 9 such that the storage rack 7 is moved outside the storage chamber 3 in a case in which the preparation work is completed for all the trays 5, which house the tools, stored in the storage rack 7, and storing of all the trays 5 housing the container 55 in the storage rack 7 is completed. That is, when the movement of the storage rack 7 to the outside is performed after the preparation work is completed for all the trays 5, it is possible to perform the movement of the storage rack 7 upon a state in which the preparation chamber 4 and the preparatory chamber 2 are isolated from each other by closing the shutters 7A to 7D at both the sides of the storage chamber 3, for example, and thus, it is possible to secure the stability.

In addition, an emergency response is possible in the embodiment since it is possible to respond the request of the user M of taking out a specific prepared liquid medicine before the entire preparation work is completed, for example, in a case in which the controller 300 has the second operation controller 302 that controls the taking-in-and-out device 8 such that the specific tray 5 among the trays 5 housing the container 55 stored in the storage rack 7 is taken out from the storage rack 7 in response to the request of the user M.

In addition, the emergency response is possible in the embodiment since it is possible to respond the request of the user M of urgently performing different preparation of a specific liquid medicine from the preparation work for the tray 5 stored in the storage chamber 3, for example, in a case in which the liquid medicine preparation system 1 further has the preparatory chamber 2 in which the single set of tools is set to the tray 5 to be stored in the storage rack 7, and the controller 300 has the third operation controller that performs control, in response to a request of the user M, such that the tray 5 to which the tool has been set in the preparatory chamber 2 is transported to the preparation chamber 4 without being stored in the storage chamber 3 so as to perform the preparation work, and the tray 5, in which the container 55 of the prepared liquid medicine is housed, is transported to the preparatory chamber 2 without being stored in the storage chamber 3.

As above, the embodiment has been described in detail with reference to the attached drawings. However, the scope of the technical idea described in the claims is not limited to the embodiment that has been described herein. It is obvious that any person with ordinary knowledge in the technical field to which the embodiment pertains can come up with the idea of making various changes, modifications, and combinations within the scope of the technical idea. Therefore, it is to be understood that techniques obtained by making such changes, modifications, and combinations are also within the scope of the technical idea.

Figure 11:
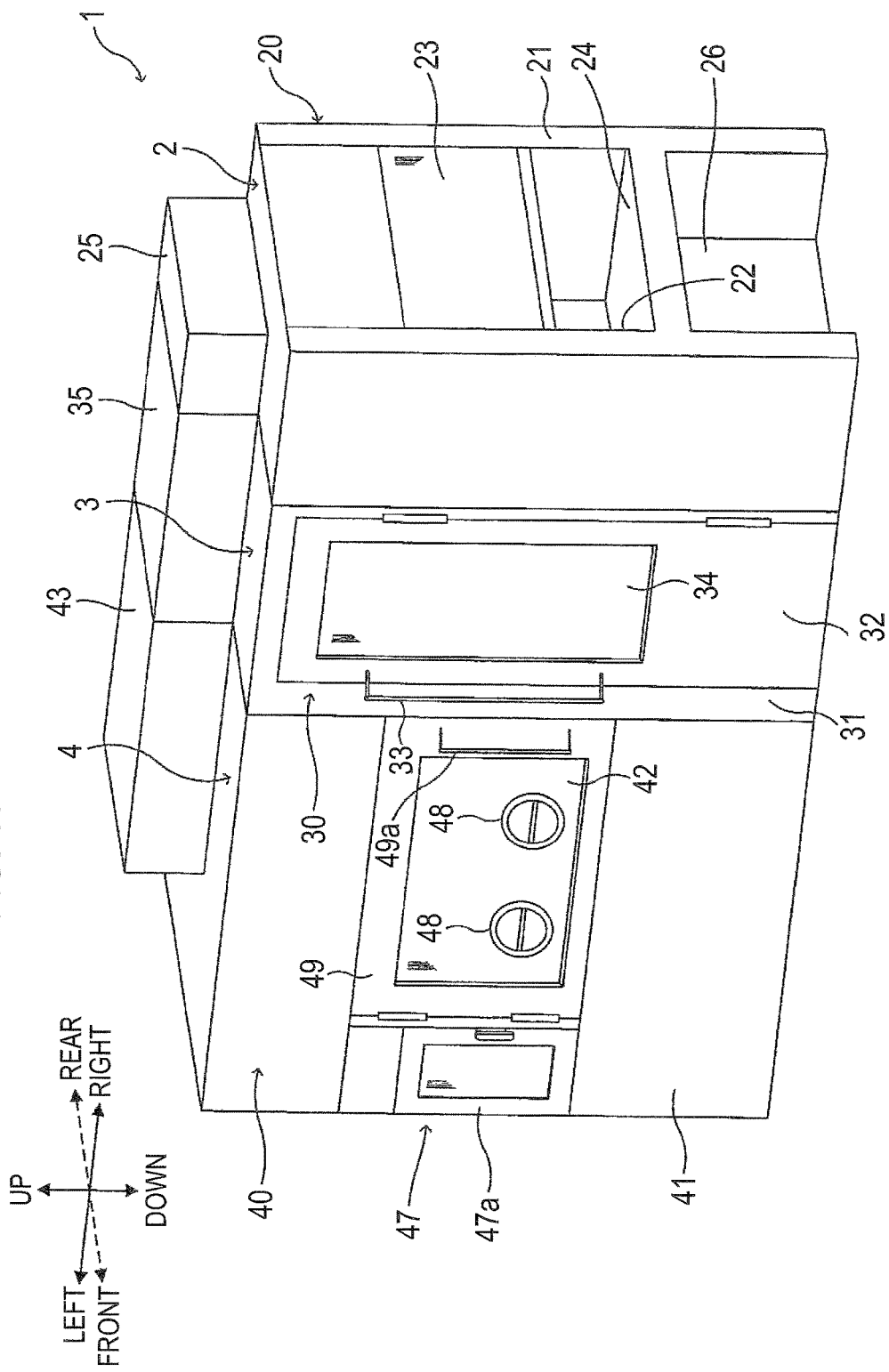
FIG. 11 is an explanatory diagram illustrating an example of an overall schematic configuration of a liquid medicine preparation system according to a modified example.

As illustrated in FIG. 11, for example, a pass-box 47 may be provided in the wall section 41 of the casing 40 of the preparation chamber 4. The pass-box 47 is provided with a door 47a at the outer side, and a door (not illustrated) at the inner side, and is used in taking in and out or the like of an article with respect to the preparation chamber 4. In addition, a glove port 48 may be provided in the window 42. A glove (not illustrated) is provided inside the glove port 48. For example, the user M can perform cleaning work inside the preparation chamber 4 or the like by putting a fabric for cleaning in the pass-box 47, and taking out the fabric from the pass-box 47 using the glove by inserting the hand into the glove port 48.

Incidentally, in a case in which "vertical", "parallel", and the like are described in the above description, the corresponding descriptions do not indicate the strict sense of the words. That is, the word of "vertical" or "parallel" allows a tolerance or an error in design or manufacturing, and means "substantially vertical" or "substantially parallel".

In addition, in a case in which the descriptions, that is, dimensions or sizes are "the same", "equivalent", "different", and the like in appearance, are present in the above description, the corresponding descriptions do not indicate the strict sense of the words. That is, the word of "the same", "equivalent", or "different" allows a tolerance or an error in design or manufacturing, and means "substantially the same", "substantially equivalent", or "substantially different".

<10. Exemplary Hardware Configuration of Controller>

Next, a description will be given regarding an exemplary hardware configuration of the controller 300 that realizes the processed according to the respective operation controllers 301 to 303 implemented by the program to be executed by the CPU 901 described above with reference to FIG. 10.

Figure 10:
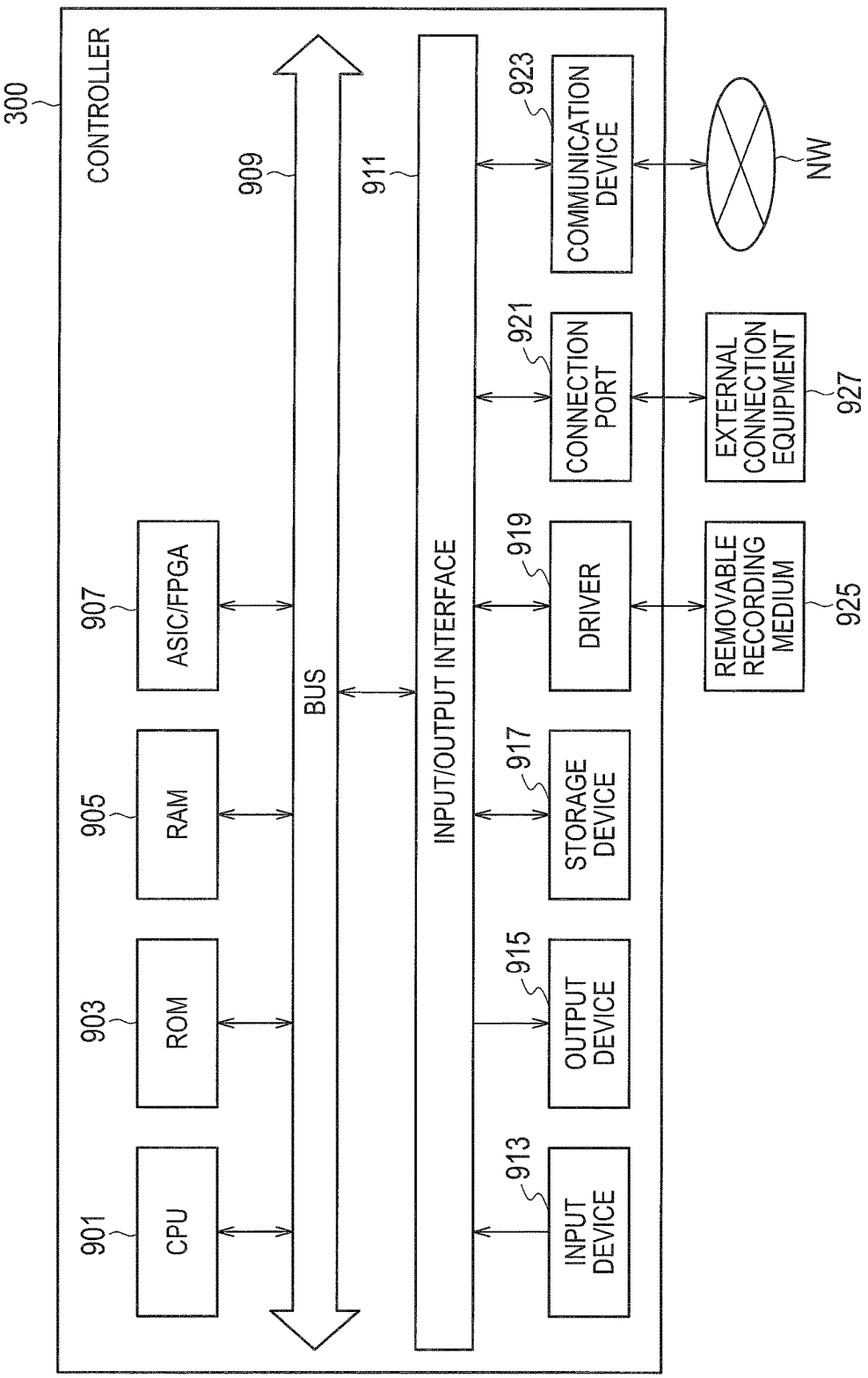
FIG. 10 is an explanatory diagram illustrating an exemplary hardware configuration example of the controller.

As illustrated in FIG. 10, the controller 300 has, for example, the CPU 901, ROM 903, RAM 905, a dedicated integrated circuit 907 built for a specific application such as the ASIC or the FPGA, an input device 913, an output device 915, a storage device 917, a driver 919, a connection port 921, and a communication device 923. These configurations are connected to each other such that a signal can be transmitted to each other via a bus 909 and an input/output interface 911.

The program can be recorded in a recording device, for example, the ROM 903, the RAM 905, the storage device 917, or the like.

In addition, the program can be also temporarily or permanently recorded in a removable recording medium 925, for example, a magnetic disk such as a flexible disk, various types of optical disks such as CD's, magneto-optical (MO) disks, or DVD's, a semiconductor memory, or the like. Such a removable recording medium 925 can be provided also as so-called packaged software. In this case, the program recorded in the removable recording medium 925 may be read by the driver 919, and recorded in the recording device via the input/output interface 911, the bus 909, and the like.

In addition, the program can be recorded in, for example, a download site, another computer, another recording device, and the like (not illustrated). In this case, the program is transferred via a network NW such as LAN or the Internet, and received by the communication device 923. Further, the program received by the communication device 923 may be recorded in the above-described recording device via the input/output interface 911, the bus 909, and the like.

In addition, the program can be also recorded in, for example, external connection equipment 927 as appropriate. In this case, the program is transferred via the connection port 921 as appropriate, and may be recorded in the above-described recording device via the input/output interface 911, the bus 909, and the like.

Further, when the CPU 901 executes various types of processing according to the program recorded in the above-described recording device, the above-described processes according to the respective operation controllers 301 to 303 and the like are realized. At this time, the CPU 901 may directly read and execute the program from the above-described recording device, for example, or may once load the program to the RAM 905, and execute the program. Further, the CPU 901 may directly execute the received program without recording the program in the recording device in the case of receiving the program via the communication device 923, the driver 919, or the connection port 921, for example.

In addition, the CPU 901 may perform various types of processing based on a signal or information input from the input device 913, for example, a mouse, a keyboard, a microphone (not illustrated) or the like if necessary.

Further, the CPU 901 may output a result of executing the processing from the output device 915, for example, a display device, a voice output device, and the like. Further, the CPU 901 may transmit the processing result via the communication device 923 or the connection port 921 if necessary, and may record the result in the above-described recording device or the removable recording medium 925.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid medicine preparation system that prepares a liquid medicine, the system comprising:
 a preparation zone in which preparation work of the liquid medicine is performed by a robot; and
 a storing zone which has a plurality of first spaces each of which is capable of storing a container housing the liquid medicine prepared,
 wherein the storing zone includes:
  a storage rack on which a mounter to which a tray housing the container is mountable is arranged while being stacked in multiple stages, and
  a taking-in-and-out device configured to perform taking in and out of the tray with respect to the mounter,
 wherein the storing zone further includes a rack moving device that moves the storage rack inside and outside the storing zone, wherein the mounter includes a partition plate which covers a lower side in a vertical direction of the tray and is attachable to and detachable from the mounter, and further comprising a photoelectric sensor which is arranged in a vicinity of the storage rack, emits light in a stacking direction of the mounter, and detects popping up of the tray and the partition plate from the storage rack.

2. The liquid medicine preparation system according to claim 1, wherein
the taking-in-and-out device has a substantially L-shaped holder which is supported to be movable in three-axis directions that are orthogonal to one another, and holds a flange of the tray.

3. The liquid medicine preparation system according to claim 1, wherein
the rack moving device has:
an arm member of which an intermediate portion is rotatably supported and one end portion is connected with the storage rack,
a weight member which is connected to other end portion of the arm member, and
a motor which causes the arm member to rotationally operate.

4. The liquid medicine preparation system according to claim 3, further comprising:
a transport device which is arranged in the storing zone and transports the tray,
wherein the transport device is configured to form a second space that avoids interference with the arm member in a transport path by having at least a part reciprocatively moving in a transport direction.

5. The liquid medicine preparation system according to claim 1, wherein
the storage rack places the tray, in which a plurality of tools to be used in the preparation work are housed for a single set, the single set having a predetermined one of the tools, to the mounter.

6. The liquid medicine preparation system according to claim 5, wherein
the robot executes the preparation work using the tools housed in a plurality of the trays placed in the storage rack.

7. A liquid medicine preparation system that prepares a liquid medicine, the system comprising:
a preparation zone in which preparation work of the liquid medicine is performed by a robot; and
a storing zone which has a plurality of first spaces each of which is capable of storing a container housing the liquid medicine prepared,
wherein the storing zone includes:
a storage rack on which a mounter to which a tray housing the container is mountable is arranged while being stacked in multiple stages, and
a taking-in-and-out device configured to perform taking in and out of the tray with respect to the mounter,
wherein the storage rack places the tray, in which a plurality of tools to be used in the preparation work are housed for a single set, the single set having a predetermined one of the tools, to the mounter, and
wherein the system further comprises:
a loading device which loads the tray housing the tool from the storing zone to the preparation zone; and
an unloading device which is arranged in a path different from a path of the loading device, and unloads the tray housing the container from the preparation zone to the storing zone.

8. The liquid medicine preparation system according to claim 7, further comprising:
a cover which is arranged in the preparation zone and covers a loading position of the tray by the loading device, and an unloading position of the tray by the unloading device, wherein
the cover has:
an opening that allows the robot to access the tray, and
a shutter that opens and closes the opening.

9. The liquid medicine preparation system according to claim 1, further comprising:
a controller which has a first operation controller that controls the rack moving device to move the storage rack outside the storing zone, when the preparation work is completed for all the trays which are stored in the storage rack and in which the tools are housed, and when storing of all the trays in which the containers are housed in the storage rack is completed.

10. The liquid medicine preparation system according to claim 9, wherein
the controller has a second operation controller that controls the taking-in-and-out device to take out a specific one of the trays among the trays, which are stored in the storage rack and in which the containers are housed, from the storage rack in response to a request of a user.

11. The liquid medicine preparation system according to claim 9, further comprising:
a preparatory zone in which a single set of tools is set on the tray to be stored in the storage rack,
wherein the controller has a third operation controller that performs control, in response to a request of a user, such that the preparation work is performed by transporting the tray to which the tool is set in the preparatory zone to the preparation zone without storing the tray in the storing zone, and the tray, in which the container of the prepared liquid medicine is housed, is transported to the preparatory zone without being stored in the storing zone.

12. A liquid medicine preparation system that prepares a liquid medicine, the system comprising:
a first zone in which preparation work of the liquid medicine is performed by a robot;
a second zone in which tools to be used in the preparation work are set for a single set, the single set having a predetermined one of the tools; and
a third zone which is arranged between the first zone and the second zone,
wherein the third zone includes:
a storage rack on which a mounter to which a tray housing a container is mountable is arranged while being stacked in multiple stages, and
a taking-in-and-out device configured to perform taking in and out of the tray with respect to the mounter,
wherein the third zone further includes a rack moving device that moves the storage rack inside and outside the third zone,
wherein the mounter includes a partition plate which covers a lower side in a vertical direction of the tray and is attachable to and detachable from the mounter, and
further comprising a photoelectric sensor which is arranged in a vicinity of the storage rack, emits light in a stacking direction of the mounter, and detects popping up of the tray and the partition plate from the storage rack.

13. A method of preparing a liquid medicine, the method comprising:

performing preparation work of the liquid medicine using a robot; and storing, in a storing zone, containers that house the prepared liquid medicine respectively in a plurality of spaces, wherein the storing zone includes:
   a storage rack on which a mounter to which a tray housing a container of the containers is mountable is arranged while being stacked in multiple stages, and
   a taking-in-and-out device configured to perform taking in and out of the tray with respect to the mounter, wherein the storing zone further includes a rack moving device that moves the storage rack inside and outside the storing zone, wherein the mounter includes a partition plate which covers a lower side in a vertical direction of the tray and is attachable to and detachable from the mounter, and further comprising using a photoelectric sensor which is arranged in a vicinity of the storage rack, to emit light in a stacking direction of the mounter, and to detect popping up of the tray and the partition plate from the storage rack.

* * * * *